US012073549B2

United States Patent
Irie et al.

(10) Patent No.: US 12,073,549 B2
(45) Date of Patent: Aug. 27, 2024

(54) STRESS ANALYSIS DEVICE

(71) Applicant: Panasonic Intellectual Property Management Co., Ltd., Osaka (JP)

(72) Inventors: Yousuke Irie, Nara (JP); Hirotsugu Inoue, Tokyo (JP); Michiyasu Hirota, Nagano (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 280 days.

(21) Appl. No.: 17/679,298

(22) Filed: Feb. 24, 2022

(65) Prior Publication Data

US 2022/0180502 A1 Jun. 9, 2022

Related U.S. Application Data

(63) Continuation of application No. PCT/JP2020/027271, filed on Jul. 13, 2020.

(30) Foreign Application Priority Data

Aug. 30, 2019 (JP) .................................. 2019-158453

(51) Int. Cl.
*G06T 7/00* (2017.01)
*G01K 11/26* (2006.01)

(52) U.S. Cl.
CPC ............ *G06T 7/0004* (2013.01); *G01K 11/26* (2013.01); *G06T 2207/20212* (2013.01); *G06T 2207/30108* (2013.01)

(58) Field of Classification Search
CPC ......... G06T 7/0004; G06T 2207/20212; G06T 2207/30108; G06T 2207/10048;

(Continued)

(56) References Cited

U.S. PATENT DOCUMENTS 8,036,491 B2 * 10/2011 Matsui ...................... G06T 7/33
345/677
8,289,405 B2 * 10/2012 Tsutsumi ............... H04N 23/68
348/208.6

(Continued)

FOREIGN PATENT DOCUMENTS

CN 103268596 B 4/2017
WO 2017/141294 A1 8/2017

OTHER PUBLICATIONS

International Preliminary Report on Patentability dated Mar. 10, 2022 issued in International Patent Application No. PCT/JP2020/027271, with English translation.

(Continued)

*Primary Examiner* — Bobbak Safaipour
(74) *Attorney, Agent, or Firm* — Rimon P.C.

(57) ABSTRACT

A stress analysis device includes: an imaging element that obtains temperature images over a same time range for a same region of an object; a feature point extractor that extracts a feature point in each of the temperature images; a projection transformer that performs projective transformation on each of the temperature images to align the feature point in the temperature images, and aligns the temperature images with respect to a temperature image being a reference; a pixel rearranger that rearranges a pixel array of each of the temperature images subjected to the projective transformation with respect to a pixel array of the temperature image that is the reference; a stress converter that obtains a stress image by multiplying each of the temperature images after pixel rearrangement by a stress conversion coefficient; and an additional averaging part that obtains an additional averaging stress image by adding and averaging the stress images.

8 Claims, 21 Drawing Sheets

(58) Field of Classification Search
CPC .. G06T 5/50; G06T 5/70; G01K 11/26; G01N 2203/0647; G01N 3/068; G01N 3/32
See application file for complete search history.

(56) References Cited

U.S. PATENT DOCUMENTS

| | | | |
|---|---|---|---|
| 2013/0046178 A1* | 2/2013 | Cho | A61B 8/5223 600/438 |
| 2015/0358542 A1 | 12/2015 | Sato | |
| 2018/0096487 A1* | 4/2018 | Nash | G06T 7/30 |
| 2018/0348064 A1 | 12/2018 | Irie et al. | |
| 2021/0318565 A1* | 10/2021 | Song | G06T 7/0004 |
| 2021/0396587 A1* | 12/2021 | Oyaizu | G01J 5/80 |
| 2022/0180502 A1* | 6/2022 | Irie | G06T 7/0004 |

OTHER PUBLICATIONS

Extended European Search Report dated Jan. 5, 2023 issued in the corresponding European Patent Application No. 20856201.7.

International Search Report issued in International Patent Application No. PCT/JP2020/027271, dated Oct. 6, 2020; with English translation.

European Office Action dated Oct. 31, 2023 issued in the corresponding European Patent Application No. 20856201.7.

Summons to Attend Oral Proceedings dated May 10, 2024 issued in the corresponding European Patent Application No. 20856201.7.

Chinese Office Action dated Apr. 26, 2024 issued in the corresponding Chinese Patent Application No. 202080059646.0, with English machine translation.

David G Lowe: "Distinctive Image Features from Scale-Invariant Keypoints", International Journal of Computer Vision 60(2), pp. 91-110, 2004.

Johan Johansson: "Interest Point Detectors and Descriptors for IR Images: An Evaluation of Common Detectors and Descriptions on IR images", KTH Royal Institute of Technology, School of Computer Science and Communication (CSC).

Chia-Yen Lee: "Automatic Marker-free Longitudinal Infrared Image Registration by Shape Context Based Matching and Competitive Winner-guided Optimal Corresponding", Scientific Reports, pp. 1-16.

* cited by examiner (a)

(b)

(a)

(b)

(a)

(b)

(a)

(b)

DATA POINT BEFORE AND
AFTER INTERPOLATION

STRESS ANALYSIS DEVICE

CROSS-REFERENCE TO RELATED APPLICATIONS

This is a continuation application of International Application No. PCT/JP2020/027271, with an international filing date of Jul. 13, 2020, which claims priority of Japanese Patent Application No. 2019-158453 filed on Aug. 30, 2019, the content of which is incorporated herein by reference.

BACKGROUND

1. Technical Field

The present disclosure relates to a stress analysis device using a plurality of temperature images.

2. Description of the Related Art

Various techniques have been proposed for performing stress analysis from the temperature images (see for example WO2017/141294). In these stress analysis techniques, a stress image is obtained from the temperature image by using the fact that there is a linear relationship between temperature change of an object obtained from the temperature image and a stress applied to the object.

SUMMARY

However, when a stress change is obtained from a general temperature image, the stress image with sufficient accuracy has not been obtained due to a noise generated from an imaging element.

The present disclosure was conceived in view of the situations and it is therefore one non-limiting and exemplary embodiment provides a stress analysis device capable of obtaining a stress image with improved accuracy.

In one general aspect, the techniques disclosed here feature: a stress analysis device according to the present disclosure includes:
  an imaging element that obtains two or more temperature images over a same time range for a same region of an object;
  a feature point extractor that extracts a feature point in each of the temperature images;
  a projection transformer that performs projective transformation on each of the temperature images so as to align the feature point in the temperature images, and aligns the temperature images with respect to a temperature image that is a reference;
  a pixel rearranger that rearranges a pixel array of each of the temperature images subjected to the projective transformation with respect to a pixel array of the temperature image that is the reference;
  a stress converter that obtains a stress image by multiplying each of the temperature images after pixel rearrangement by a stress conversion coefficient; and
  an additional averaging part that obtains an additional averaging stress image by adding and averaging the stress images.

A stress analysis method according to the present disclosure includes:
  obtaining two or more temperature images over a same time range for a same region of an object;
  extracting a feature point in each of the temperature images;
  performing projective transformation on each of the temperature images so as to align the feature point in the temperature images, and aligning the temperature images with respect to a temperature image that is a reference;
  rearranging a pixel array of each of the temperature images subjected to the projective transformation with respect to a pixel array of the temperature image that is the reference;
  obtaining a stress image by multiplying each of the temperature images after pixel rearrangement by a stress conversion coefficient; and
  obtaining an additional averaging stress image by adding and averaging the stress images.

A temperature measuring device according to the present disclosure includes:
  an imaging element that obtains two or more temperature images over a same time range for a same region of an object;
  a feature point extractor that extracts a feature point in each of the temperature images;
  a projection transformer that performs projective transformation on each of the temperature images so as to align the feature point in the temperature images, and aligns the temperature images with respect to a temperature image that is a reference;
  a pixel rearranger that rearranges a pixel array of each of the temperature images subjected to the projective transformation with respect to a pixel array of the temperature image that is the reference;
  a temperature image obtainer that obtains each of the temperature images after pixel rearrangement; and
  a temperature image additional averaging part that obtains an additional averaging temperature image by adding and averaging the temperature images.

A temperature measuring method according to the present disclosure includes:
  obtaining two or more temperature images over a same time range for a same region of an object;
  extracting a feature point in each of the temperature images;
  performing projective transformation on each of the temperature images so as to align the feature point in the temperature images, and aligning the temperature images with respect to a temperature image that is a reference;
  rearranging a pixel array of each of the temperature images subjected to the projective transformation with respect to a pixel array of the temperature image that is the reference;
  obtaining each of the temperature images after pixel rearrangement; and
  obtaining an additional averaging temperature image by adding and averaging the temperature images.

These general and specific aspects may be realized by any combination of systems, methods, computer programs, systems, methods, and computer programs.

According to the stress analysis device according to the present disclosure, since a plurality of stress images are added and averaged to obtain an additional averaging stress image, a stress image with improved accuracy can be obtained.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF DRAWINGS

The present disclosure will become readily understood from the following description of non-limiting and exemplary embodiments thereof made with reference to the accompanying drawings, in which like parts are designated by like reference numeral and in which.

DETAILED DESCRIPTION

Figure 1:
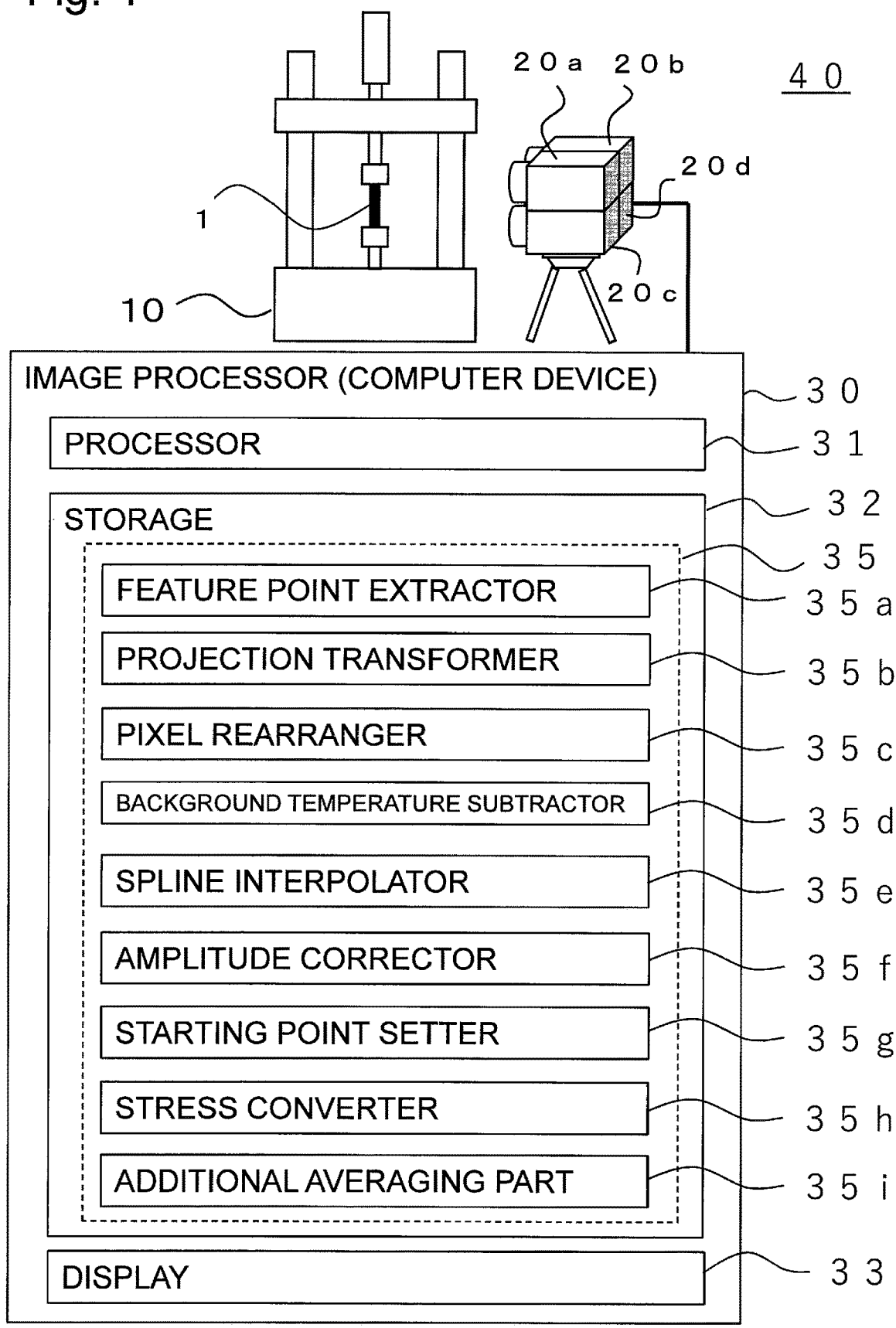
FIG. 1 is a block diagram illustrating a configuration of a stress analysis device according to a first embodiment.

A stress analysis device according to a first aspect includes:
  an imaging element that obtains two or more temperature images over a same time range for a same region of an object;
  a feature point extractor that extracts a feature point in each of the temperature images;
  a projection transformer that performs projective transformation on each of the temperature images so as to align the feature point in the temperature images, and aligns the temperature images with respect to a temperature image that is a reference;
  a pixel rearranger that rearranges a pixel array of each of the temperature images subjected to the projective transformation with respect to a pixel array of the temperature image that is the reference;
  a stress converter that obtains a stress image by multiplying each of the temperature images after pixel rearrangement by a stress conversion coefficient; and
  an additional averaging part that obtains an additional averaging stress image by adding and averaging the stress images.

Further, as a stress analysis device of a second aspect, in the first aspect, the stress analysis device further may include a background temperature subtractor that subtracts a background temperature from each of the temperature images after pixel rearrangement.

Further, as a stress analysis device of a third aspect, in the first or second aspect, the stress analysis device further may include an amplitude corrector that corrects amplitudes of each of the temperature images after pixel rearrangement by dividing a relationship between a frequency and an amplitude after Fourier transformation by a frequency response function of a first-order lag system.

Further, as a stress analysis device of a fourth aspect, in any one of the first to third aspects, the stress analysis device further may include a spline interpolator that performs spline interpolation over the same time range of each of the temperature images after pixel rearrangement.

Further, as a stress analysis device of a fifth aspect, in any one of the first to fourth aspects, when obtaining the two or more temperature images, the imaging element may cause a synchronization signal to be included in the two or more temperature images, and
  the stress analysis device further may include a starting point setter that aligns starting point for the temperature images after pixel rearrangement based on the synchronization signal.

A stress analysis method according to a sixth aspect includes:
  obtaining two or more temperature images over a same time range for a same region of an object;
  extracting a feature point in each of the temperature images;
  performing projective transformation on each of the temperature images so as to align the feature point in the temperature images, and aligning the temperature images with respect to a temperature image that is a reference;
  rearranging a pixel array of each of the temperature images subjected to the projective transformation with respect to a pixel array of the temperature image that is the reference;
  obtaining a stress image by multiplying each of the temperature images after pixel rearrangement by a stress conversion coefficient; and
  obtaining an additional averaging stress image by adding and averaging the stress images.

A temperature measuring device according to a seventh aspect includes:
  an imaging element that obtains two or more temperature images over a same time range for a same region of an object;
  a feature point extractor that extracts a feature point in each of the temperature images;
  a projection transformer that performs projective transformation on each of the temperature images so as to align the feature point in the temperature images, and aligns the temperature images with respect to a temperature image that is a reference;
  a pixel rearranger that rearranges a pixel array of each of the temperature images subjected to the projective transformation with respect to a pixel array of the temperature image that is the reference;
  a temperature image obtainer that obtains each of the temperature images after pixel rearrangement; and
  a temperature image additional averaging part that obtains an additional averaging temperature image by adding and averaging the temperature images.

A temperature measuring method according to an eighth aspect includes:
  obtaining two or more temperature images over a same time range for a same region of an object;
  extracting a feature point in each of the temperature images;
  performing projective transformation on each of the temperature images so as to align the feature point in the temperature images, and aligning the temperature images with respect to a temperature image that is a reference;
  rearranging a pixel array of each of the temperature images subjected to the projective transformation with respect to a pixel array of the temperature image that is the reference;
  obtaining each of the temperature images after pixel rearrangement; and obtaining an additional averaging temperature image by adding and averaging the temperature images.

Hereinafter, the stress analysis device according to the embodiments will be described with reference to the attached drawings. In the drawings, substantially the same members are denoted by the same reference numerals.

First Embodiment

<Stress Analysis Device>

FIG. 1 is a block diagram illustrating a configuration of a stress analysis device 40 according to a first embodiment.

The stress analysis device 40 includes imaging elements 20a to 20d that obtain two or more temperature images, a feature point extractor 35a that extracts a feature point in each of the temperature images, a projection transformer 35b that aligns the temperature images, a pixel rearranger 35c that rearranges the pixel array of each of the temperature images, a stress converter 35h that obtains a stress image by multiplying each of the temperature images by the stress conversion coefficient, and an additional averaging part 35i that obtains the additional averaging stress image by adding and averaging the stress images. The imaging elements 20a to 20d obtain two or more temperature images over the same time range for the same region of an object 1. The projection transformer 35b performs projective transformation on each of the temperature images so as to align the feature point in the temperature images, and aligns the temperature images with respect to the temperature image that is the reference. The pixel rearranger 35c rearranges the pixel array of each of the temperature images subjected to the projective transformation with respect to the pixel array of the temperature image that is the reference.

According to the stress analysis device 40, two or more stress images are added and averaged to obtain the additional averaging stress image. Thus, a noise generated from the imaging element is canceled by adding and averaging the stress images, and a stress image with improved accuracy can be obtained.

Members constituting the stress analysis device 40 will be described below.

Object

The object 1 is a body for which stress is analyzed. Although the object 1 is illustrated as an elongated test piece in FIG. 1, the object 1 is not limited to this. For example, the object 1 may be an architecture such as a bridge, a building, or a tower, or a movable body such as a vehicle, a ship, or an aircraft, and an infrared camera may move.

<Load Applying Portion>

In FIG. 1, the object 1 is supported by a load applying portion 10. A known sinusoidal load or a sinusoidal load having a plurality of frequencies may be applied to the object 1 in combination by the load applying portion 10. In this case, the load applied from the load applying portion 10 to the object 1 is known. The load applying portion 10 is provided as needed, and is an optional component. The load applied to the object 1 to be analyzed in the stress analysis device includes not only the above-mentioned known load but also an unknown load.

By applying a known load to the object 1 by the load applying portion 10, it is possible to compare temperature data obtained by the temperature images with known load data. The time constant of the frequency response function of the first-order lag system is different for each imaging element, and the stress conversion coefficient is also different. Therefore, by applying a known sinusoidal load to the object by the load applying portion 10, the time constant and the stress conversion coefficient of the frequency response function of the imaging elements can be calculated.

<Imaging Element>

FIG. 1 illustrates four imaging elements 20a to 20d. In FIG. 1, the imaging elements 20a to 20d are illustrated as a combination of four infrared cameras respectively including lenses and the imaging elements. In FIG. 1, the four imaging elements 20a to 20d are arranged in two stages, and two in each stage, but the arrangement method is not limited to this. For example, four imaging elements 20a to 20d may be arranged side by side in a horizontal row.

The imaging elements 20a to 20d have a plurality of pixels, for example, 320×256 pixels, and captures four temperature images (FIGS. 4A to 4D) of the fields of view 1 to 4 for the same region of the object 1 over the same time range. The temperature image is also called an infrared image. The image is captured at a predetermined frame rate, for example, 5 Hz to 3000 Hz (5 shots/sec to 3000 shots/sec). The above characteristics of the imaging elements 20a to 20d are merely examples, and are not limited thereto.

A case of four imaging elements is shown here, but is not limited to this. As long as two or more temperature images can be obtained, the number of imaging elements may be one or more as shown in a modification described below.

<Image Processor (Computer Device)>

An image processor 30 performs image processing on a plurality of temperature images. The image processor 30 is, for example, a computer device. As the computer device, a general-purpose computer device can be used, and for example, as illustrated in FIG. 1, the computer device includes a processor 31, a storage 32, and a display 33. The computer device may further include an input device, a storage device, an interface, and the like.

Processor

The processor 31 may be configured to perform image processing on a plurality of temperature images.

The processor 31 is only required to be, for example, a central processing operator (CPU, MPU, or the like), a microcomputer, or a processing device capable of executing instructions that can be executed by a computer.

Storage

The storage 32 may be, for example, at least one of ROM, EEPROM, RAM, flash SSD, hard disk, USB memory, magnetic disk, optical disk, magneto-optical disk, and the like.

The storage 32 includes a program 35. When the image processor 30 is connected to a network, the program 35 may be downloaded from the network as needed.

Program

The program 35 includes the feature point extractor 35a, the projection transformer 35b, the pixel rearranger 35c, the stress converter 35h, and the additional averaging part 35i as functions. They are read from the storage 32 and executed by the processor 31 at the time of execution.

In addition to the above, as shown in FIG. 1, the program may include a background temperature subtractor 35d, a spline interpolator 35e, an amplitude corrector 35f, and a starting point setter 35g as functions, but they are not essential but optional components.

The program 35 may be recorded on a non-transitory computer-readable recording medium, such as the storage 32. The above described functions may be accomplished by the storage 32 storing two or more temperature images and the processor 31. The processor may be configured to extract a feature point in each of the temperature images; to perform projective transformation on each of the temperature images so as to align the feature point in the temperature images, and align the temperature images with respect to a temperature image that is a reference; to rearrange a pixel array of each of the temperature images subjected to the projective transformation with respect to a pixel array of the temperature image that is the reference; to obtain a stress image by multiplying each of the temperature images after pixel rearrangement by a stress conversion coefficient; and to obtain an additional averaging stress image by adding and averaging the stress images.

<Feature Point Extractor>

The feature point extractor 35a extracts a feature point in each temperature image. In the temperature image, portions having different temperatures are represented by the difference in grayscale. On the other hand, portions having the same temperature are represented as the same temperature regardless of the shape and cannot be distinguished from each other. Therefore, a difference in shape or the like that can be a feature point in a normal image is not a noticeable difference in the temperature image, and is difficult to be used as the feature point. That is, in the temperature image, a portion that appears to be a different temperature can be the feature point. Therefore, for example, a pattern that partially changes the emissivity may be provided on a surface of the object. A portion in which a pattern having a different emissivity is provided even if the temperature is substantially the same as the surroundings can be recognized as an apparently different temperature in the temperature image and can be the feature point. When the surface of the object 1 has an emissivity close to that of a black body, the pattern having a different emissivity may be formed, for example, by attaching an aluminum thin film having a low emissivity to a part of the object 1.

Figure 4A:
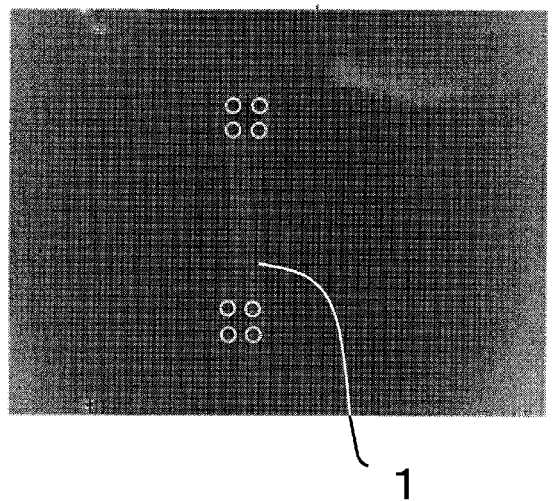
FIG. 4A is a schematic view illustrating feature points in the temperature image of the field of view 1 among four fields of view 1 to 4 of the stress analysis device according to the first embodiment.
Figure 4B:
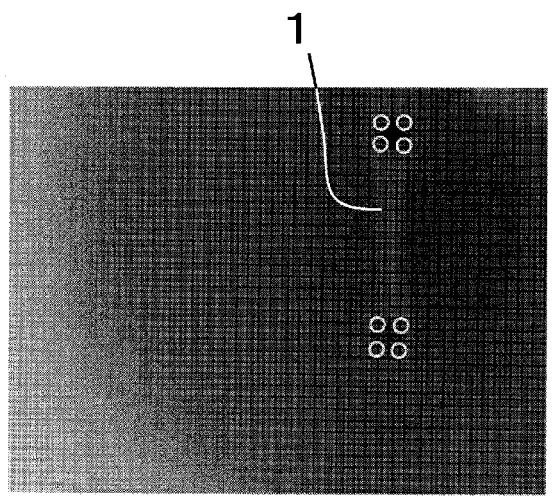
FIG. 4B is a schematic view illustrating feature points in the temperature image of the field of view 2 among the four fields of view 1 to 4 of the stress analysis device according to the first embodiment.
Figure 4C:
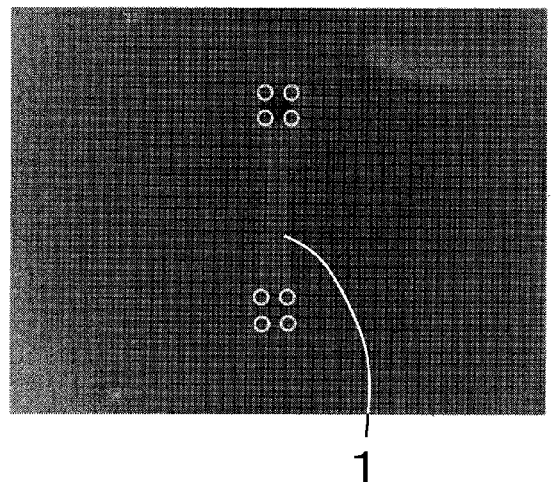
FIG. 4C is a schematic view illustrating feature points in the temperature image of the field of view 3 among the four fields of view 1 to 4 of the stress analysis device according to the first embodiment.
Figure 4D:
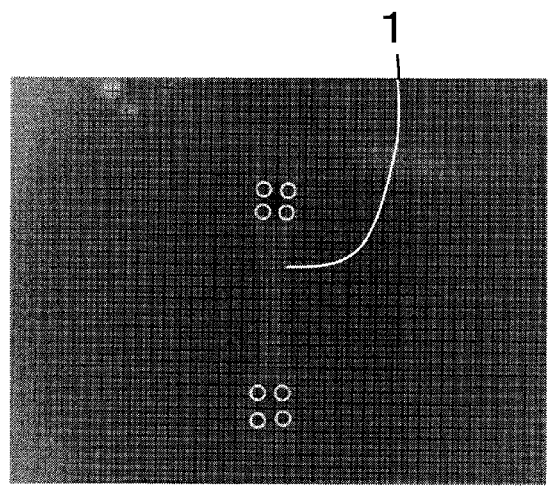
FIG. 4D is a schematic view illustrating feature points in the temperature image of the field of view 4 among the four fields of view 1 to 4 of the stress analysis device according to the first embodiment.

FIG. 4A is a schematic view illustrating the feature points in the temperature image of a field of view 1 among four fields of view of 1 to 4. FIG. 4B is a schematic view illustrating the feature points in the temperature image of a field of view 2 among the four fields of view of 1 to 4. FIG. 4C is a schematic view illustrating the feature points in the temperature image of a field of view 3 among the four fields of view of 1 to 4. FIG. 4D is a schematic view illustrating the feature points in the temperature image of a field of view 4 among the four fields of view of 1 to 4.

FIGS. 4A to 4D illustrate how the patterns having a different emissivity provided on the surface of the object 1 are detected as the feature points having a difference in apparent temperature in the temperature images of the fields of view 1 to 4. Specifically, a square pattern formed by four circles above and below the elongated object is detected as the feature point. In the temperature images of the fields of view, the square patterns above and below the object correspond to each other.

<Projection Transformer>

The projection transformer 35b performs projective transformation on the temperature images so as to align the feature point in the temperature images, and aligns the temperature images with respect to the temperature image that is the reference.

First, a coefficient of the projective transformation for superimposing the temperature images of the fields of view 2, 3, and 4 on the temperature image of the field of view 1 is calculated from the feature points. The equation of the projective transformation to convert from (x, y) to (x', y') is as follows.

$$x' = f_0 \frac{(xh_{11} + yh_{12} + f_0 h_{13})}{(xh_{31} + yh_{32} + f_0 h_{33})}$$

$$y' = f_0 \frac{(xh_{21} + yh_{22} + f_0 h_{23})}{(xh_{31} + yh_{32} + f_0 h_{33})}$$

Note that $f_0$ is a constant, and $h_{ij}$ is a coefficient. Here, f0 is set to 1, and the coefficient is calculated using the least square method.

Using a normalization operator $Z[\ ]$ that sets a third component to 1, it is expressed as $x'=Z[Hx]$.

Here, x, x', and H are expressed as follows.

$$x = \begin{pmatrix} x/f_0 \\ y/f_0 \\ 1 \end{pmatrix} \quad x' = \begin{pmatrix} x'/f_0 \\ y'/f_0 \\ 1 \end{pmatrix} \quad H = \begin{pmatrix} h_{11} & h_{12} & h_{13} \\ h_{21} & h_{22} & h_{23} \\ h_{31} & h_{32} & h_{33} \end{pmatrix}$$

It should be normalized as $\|H\|=1$.

The equation $x'=Z[Hx]$ is equivalent to the following equation because it indicates that the vectors x' and Hx are parallel.

$$x' \times Hx = 0$$

Next, 9-dimensional vectors h, $\xi^{(1)}$, $\xi^{(2)}$, and $\xi^{(3)}$ are defined as follows.

$$h = \begin{pmatrix} h_{11} \\ h_{12} \\ h_{13} \\ h_{21} \\ h_{22} \\ h_{23} \\ h_{31} \\ h_{32} \\ h_{33} \end{pmatrix} \quad \xi^{(1)} = \begin{pmatrix} 0 \\ 0 \\ 0 \\ -f_0 x \\ -f_0 y \\ -f_0^2 \\ xy' \\ yy' \\ f_0 y' \end{pmatrix} \quad \xi^{(2)} = \begin{pmatrix} f_0 x \\ f_0 y \\ f_0^2 \\ 0 \\ 0 \\ 0 \\ -xx' \\ -yx' \\ -f_0 x' \end{pmatrix} \quad \xi^{(3)} = \begin{pmatrix} -xy' \\ -yy' \\ -f_0 y' \\ xx' \\ yx' \\ f_0 x' \\ 0 \\ 0 \\ 0 \end{pmatrix}$$

The following constraint equation is obtained from $x' \times Hx=0$.

$$(\xi^{(1)}, h)=0, \ (\xi^{(2)}, h)=0, \ (\xi^{(3)}, h)=0$$

Where (a, b) is an inner product of a and b.

When N feature points $(x_\alpha, y_\alpha)$ and corresponding feature points $(x'_\alpha, y'_\alpha)$ ($\alpha=1$ to N) are given, $\xi^{(1)}$, $\xi^{(2)}$, and $\xi^{(3)}$ are respectively $\xi_\alpha^{(1)}$, $\xi_\alpha^{(2)}$, and $\xi_\alpha^{(3)}$.

Therefore, the vector h is determined such that $(\xi^{(1)}, h)$ to 0, $(\xi^{(2)}, h)$ to 0, $(\xi^{(3)}, h)$ to 0, ($\alpha=1$ to N).

The sum of squares of the constraint equation is as follows.

$$J = \frac{1}{N} \sum_{\alpha=1}^{N} \sum_{k=1}^{3} (\xi_\alpha^{(k)}, h)^2 = \frac{1}{N} \sum_{\alpha=1}^{N} \sum_{k=1}^{3} h^T \xi_\alpha^{(k)} \xi_\alpha^{(k)T} h = (h, Mh)$$

Where, M is expressed by the following equation.

$$M = \frac{1}{N} \sum_{a=1}^{N} \sum_{k=1}^{3} \xi_a^{(k)} \xi_a^{(k)T}$$

The vector h to be determined is a unit eigenvector for the minimum value of a matrix M that minimizes J.

Figure 5A:
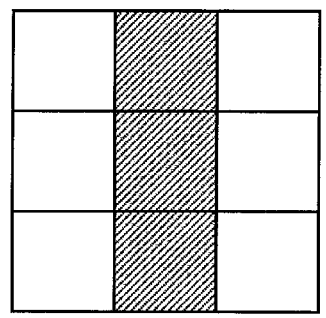
FIG. 5A(a) is a schematic view illustrating a pixel array including the feature points of the temperature image of the field of view 1, and FIG. 5A(b) is a schematic view illustrating a pixel array including the feature points of the temperature image of the field of view 2.
Figure 5A:
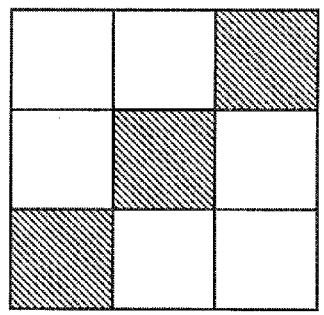
Figure 5B:
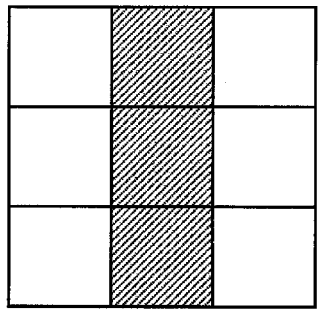
FIG. 5B(a) is a schematic view illustrating a pixel array according to a coordinate system of the temperature image of the field of view 1 that is a reference, and FIG. 5B(b) is a schematic view illustrating a pixel array of the temperature image of the field of view 2 after performing projective transformation on the temperature images of the field of view 2 of FIG. 5A(b) to the coordinate system of the temperature image of the field of view 1 so as to aligning the feature point.
Figure 5B:
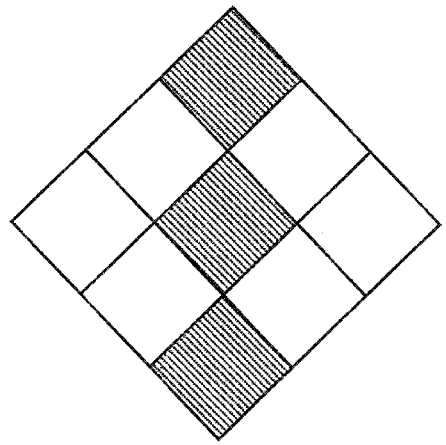

FIG. 5A(a) is a schematic view illustrating a pixel array including the feature points of the temperature image of the field of view 1, and FIG. 5A(b) is a schematic view illustrating a pixel array including the feature points of the temperature image of the field of view 2. FIG. 5B(a) is a schematic view illustrating a pixel array according to a coordinate system of the temperature image of the field of view 1 that is a reference, and FIG. 5B(b) is a schematic view illustrating a pixel array of the temperature image of the field of view 2 after performing projective transformation on the temperature images of the field of view 2 of FIG. 5A(b) to the coordinate system of the temperature image of the field of view 1 so as to aligning the feature points.

Comparing the feature points of the temperature image of the field of view 1 in FIG. 5A(a) with the feature points of the temperature image of the field of view 2 in FIG. 5A(b), it can be seen that the temperature image of the field of view 2 is rotated clockwise by 45° with respect to the temperature image of the field of view 1. Therefore, in order to align the corresponding feature points using the temperature image of the field of view 1 as the reference, it is necessary to perform projective transformation of rotating the temperature image of the field of view 2 counterclockwise by 45°.

The temperature image of the field of view 2 in FIG. 5B(b) is the schematic view illustrating the pixel array after performing projective transformation of rotating the temperature image of the field of view 2 in FIG. 5A(b) counterclockwise by 45°. Comparing the temperature image of the field of view 1 in FIG. 5B(a) with the temperature image of the field of view 2 after the projective transformation in FIG. 5B(b), it can be seen that the feature points correspond to each other.

Thus, the temperature image of the field of view 2 can be aligned with the temperature image of the field of view 1 as the reference.

<Pixel Rearranger (Resampling)>

Figure 6A:
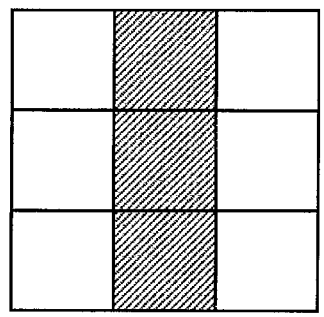
FIG. 6A(a) is a schematic view illustrating the pixel array according to the coordinate system of the temperature image of the field of view 1 that is the reference, and FIG. 6A(b) is a schematic view illustrating the pixel array of the temperature image of the field of view 2 after performing projective transformation to the coordinate system of the temperature image of the field of view 1.
Figure 6A:
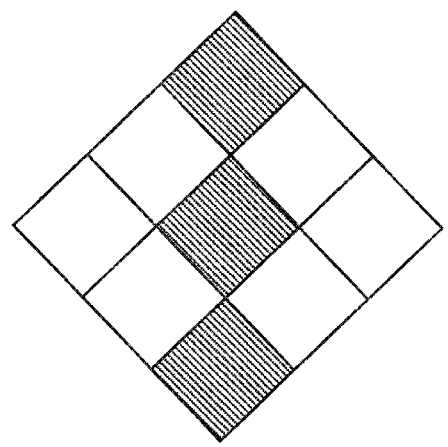
Figure 6B:
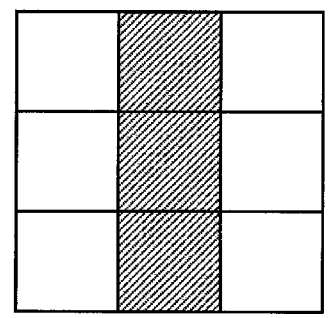
FIG. 6B(a) is a schematic view illustrating the pixel array of the temperature image of the field of view 1 that is the reference, and FIG. 6B(b) is a schematic view illustrating the pixel array of the temperature image of the field of view 2 in which the pixel array of the temperature image of the field of view 2 is rearranged to correspond to the pixel array of the temperature image of the field of view 1.
Figure 6B:
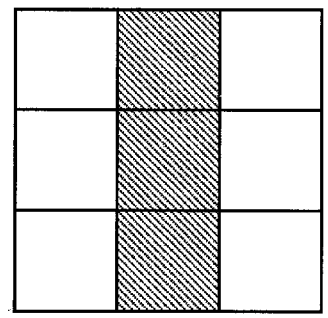

FIG. 6A(a) is a schematic view illustrating the pixel array according to the coordinate system of the temperature image of the field of view 1 that is the reference, and FIG. 6A(b) is a schematic view illustrating the pixel array of the temperature image of the field of view 2 after performing projective transformation to the coordinate system of the temperature image of the field of view 1. FIG. 6B(a) is a schematic view illustrating the pixel array of the temperature image of the field of view 1 that is the reference, and FIG. 6B(b) is a schematic view illustrating the pixel array of the temperature image of the field of view 2 in which the pixel array of the temperature image of the field of view 2 is rearranged to correspond to the pixel array of the temperature image of the field of view 1. In the figures, it is assumed that the pixels are respectively arranged in squares of 3 rows and 3 columns.

The pixel rearranger 35c rearranges the pixel array of each temperature image subjected to the projective transformation with respect to the pixel array of the temperature image that is the reference. Pixel rearrangement is also called resampling. For example, as illustrated in FIG. 6A(b), the pixel array of the temperature image of the field of view 2 after the projective transformation may be rotated with respect to the pixel array of the temperature image of the field of view 1. In this case, it may be unclear which pixel corresponds to each temperature image. Therefore, the pixel rearranger 35c rearranges the pixels so that a configuration of the pixel array of the temperature image of the field of view 2 align with a configuration of the pixel array of the temperature image of the field of view 1.

Specifically, comparing the pixel array of the temperature image of the field of view 2 after the projective transformation in FIG. 6A(b) and the pixel array of the temperature image of the field of view 2 after pixel rearrangement in FIG. 6B(b), pixels of three feature points in the center of the pixel array of the field of view 2 before the pixel rearrangement directly correspond to three vertical pixels in the center. On the other hand, pixels at corners on both sides before the pixel rearrangement respectively correspond to middle pixels on both sides after pixel rearrangement. Further, the pixels on the side adjacent to the corners on both sides before the pixel rearrangement correspond to the pixels on the corners on both sides after pixel rearrangement.

Thus, when comparing the pixel array of the field of view 1 in FIG. 6B(a) with the pixel array of the field of view 2 in FIG. 6B(b), the pixel arrays of both have the same configuration, and the pixels corresponding to each other are clear.

Figure 7:
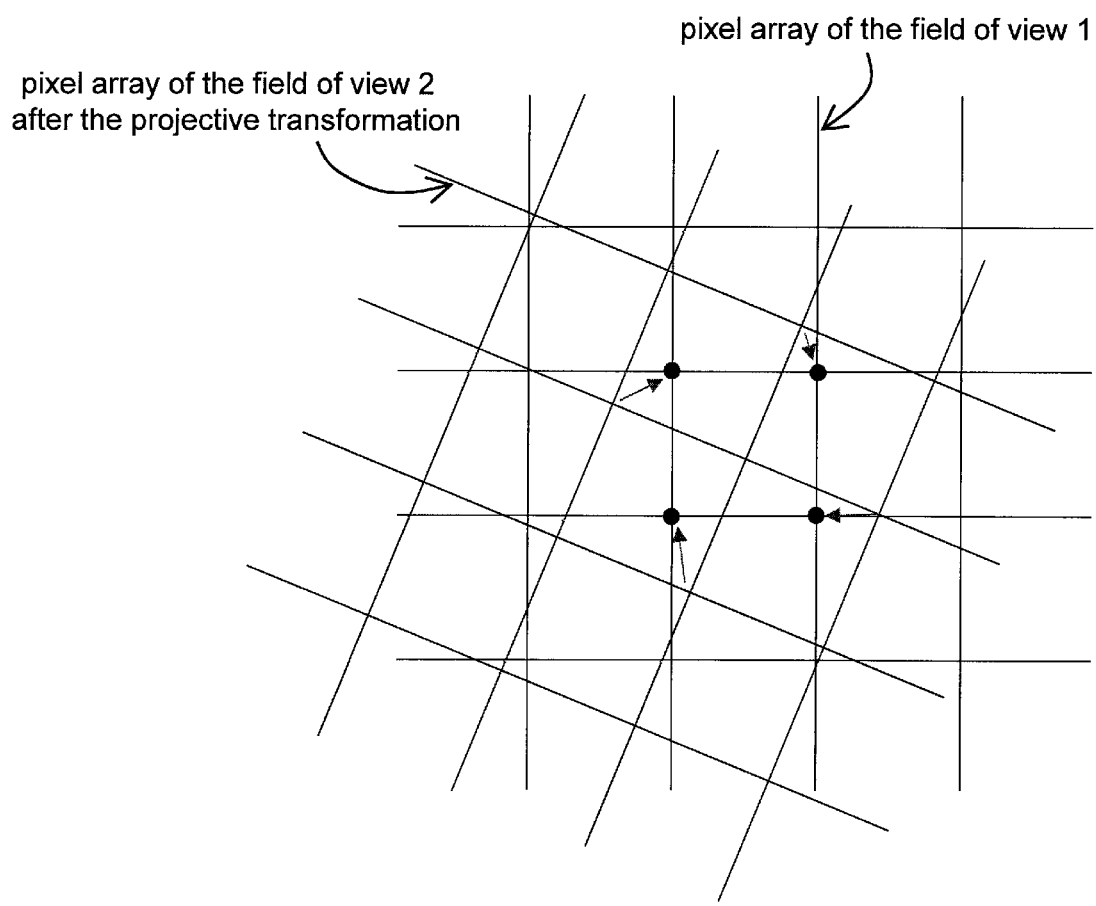
FIG. 7 is a schematic view illustrating that the pixel array of the field of view 2 after the projective transformation is rearranged to the pixel array of the nearest field of view 1.

FIG. 7 is a schematic view illustrating that the pixel array of the field of view 2 after the projective transformation is rearranged to the pixel array of the nearest field of view 1. In FIG. 7, unlike the pixel array in which the pixels are arranged in the squares illustrated in FIGS. 6A and 6B, the pixel array of the field of view 1 and the pixel array of the field of view 2 after the projective transformation are illustrated assuming that the pixels are at grid points.

In the case of FIG. 6A, the pixel array of the field of view 2 is an example of the pixel rearrangement when the pixel array of the field of view 2 is rotated clockwise by 45° with respect to the pixel array of the field of view 1, but the pixel rearrangement is not limited to this. That is, when the pixel arrays form an arbitrary angle with each other, as illustrated in FIG. 7, the pixels of the pixel array of the field of view 2 are rearranged to the pixels of the pixel array of the nearest field of view 1. Specifically, the pixels of the pixel array of the field of view 2, which are nearest to the pixels of the pixel array of the field of view 1, are rearranged as illustrated by arrows in FIG. 7. This method is called a "nearest neighbor method". Thus, the pixel array of the field of view 2 has the same configuration as the pixel array of the field of view 1.

Thus, even when the pixel arrays of the fields of view form an arbitrary angle with each other, the pixel array of the field of view 2 can be rearranged to a pixel array similar to the pixel array of the field of view 1.

Note that the pixel rearrangement method is not limited to the above-mentioned nearest neighbor method, and other methods may be used. Further, the pixel rearrangement is not an indispensable configuration, and may be provided as needed.

<Background Temperature Subtractor>

The background temperature subtractor 35d subtracts the background temperature from each temperature image after pixel rearrangement. The background temperature may be, for example, a temperature of a background object or the like that is present around the object but is not related to the object and is not stressed. By subtracting the background temperature from the temperature image, a back noise generated by temperature change of the environment can be reduced. Especially when the temperature change is large, it is effective for noise reduction. The background object is not limited to a naturally present object, and may be, for example, a board installed in advance.

In the case of the imaging element such as a cooling type imaging element in which temperature drift occurs, it is effective to reflect an object whose temperature change is considered to be constant in the temperature image as the object whose background temperature can be obtained.

Note that the background temperature subtractor is not essential when it is not necessary to substantially consider a change in the background temperature.

<Spline Interpolator>

The spline interpolator 35e performs spline interpolation over the same time range of each temperature image after pixel rearrangement. The spline interpolation is performed by obtaining a polynomial approximation, for example, a cubic approximation, between data points so that each data point is smoothly connected to each pixel of each temperature image based on the data points before the interpolation by sampling. By performing the spline interpolation, it is possible to obtain the temperature change over continuous time between the data points of the temperature images. Thus, the frame rate varies for each imaging element, the sampling is performed at different timings, and even when the data points vary in the temperature images, the data points at the same timing can be calculated by the interpolation. The spline interpolation can be performed by a commonly employed method.

For measurement data $(x_0, y_0), (x_1, y_1), \ldots (x_n, y_n)$, an interpolated value y of x in an interval $[x_i, x_{i+1}]$ (i=0, 1, ..., n−1) is obtained by the following equation.

$$y = Ay_i + By_{i+1} + Cy''_i + Dy''_{i+1}$$

$$A = \frac{x_{i+1} - x}{x_{i+1} - x_i}$$

$$B = 1 - A$$

$$C = \frac{(A^3 - A)(x_{i+1} - x_i)^2}{6}$$

$$D = \frac{(B^3 - B)(x_{i+1} - x_i)^2}{6}$$

Figure 8:
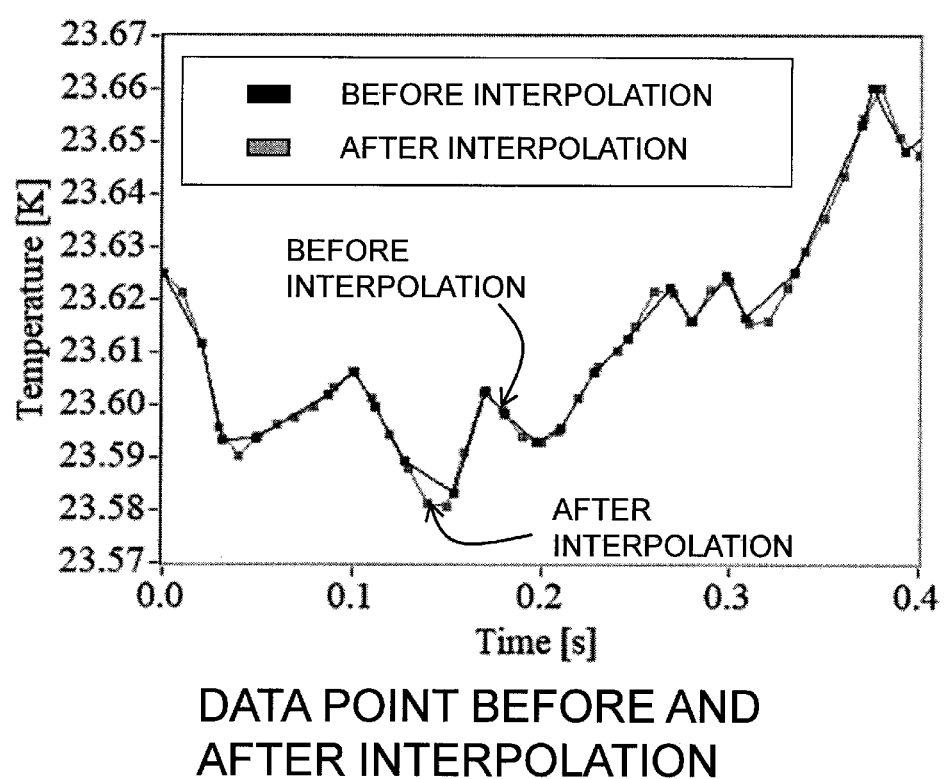
FIG. 8 is a schematic view illustrating data points before interpolation by sampling a temperature change of one pixel and data points after interpolation that interpolates between data points by sampling.

FIG. 8 is a schematic view illustrating the data points before the interpolation by sampling the temperature change of one pixel and the data points after the interpolation that interpolates between the data points by sampling. As illustrated in FIG. 8, after the interpolation, the interpolated data points are illustrated between the sampled data points as the data points at the same timing in each temperature image.

Note that it is not necessary to perform the spline interpolation when the sampling timing of each temperature image is substantially the same, or when the plurality of temperature images is obtained by the same imaging element as in the case of a compound eye infrared camera.

<Amplitude Corrector>

Figure 9:
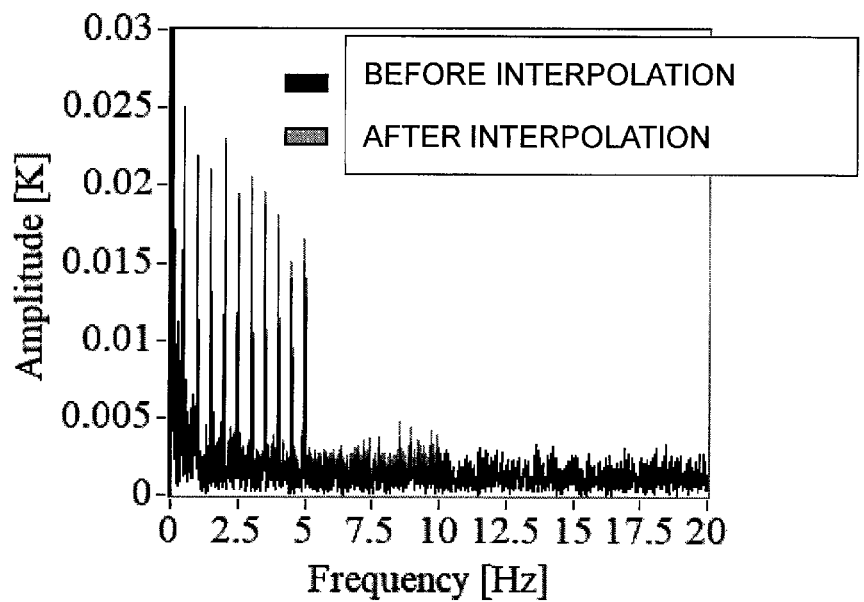
FIG. 9 is a schematic view illustrating a state before and after amplitude correction of an amplitude of the temperature image with respect to frequency after Fourier transformation.
Figure 10:
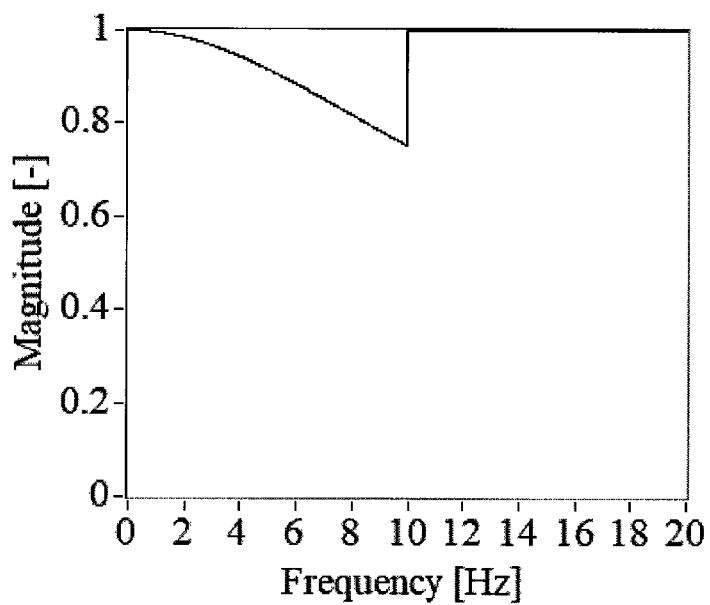
FIG. 10 is a diagram illustrating an example of a frequency response function of a first-order lag system used for amplitude correction in FIG. 9.

FIG. 9 is a schematic view illustrating a state before and after amplitude correction of the amplitude of the temperature image with respect to the frequency after Fourier transformation. FIG. 10 is a diagram illustrating an example of the frequency response function of the first-order lag system used for the amplitude correction in FIG. 9.

The amplitude corrector 35f corrects the amplitude of each temperature image after pixel rearrangement by dividing the relationship between the frequency and the amplitude after Fourier transformation by the frequency response function of the first-order lag system.

The amplitude of the temperature change tends to be attenuated as the frequency increases. It is assumed that this attenuation tendency of the amplitude is represented by, for example, the first-order lag system. The frequency response function in this case is illustrated in FIG. 10 and is expressed by the following equation. In FIG. 10, a frequency ω to be corrected is up to 10 Hz. This is because the higher the frequency, the larger an amount of correction, so that here an upper limit of a frequency range to be corrected is 10 Hz. In this case, the frequency is high even at 10 Hz. That is, since the frequency response function of the first-order lag system is smaller as the frequency is higher, the amplitude after correction is larger as the frequency is higher. If the frequency is the upper limit or more of the frequency to be corrected, since a value of the frequency response function is set to 1, the correction is not performed.

$$H(\omega) = (1 - j\omega\alpha)/(1 + \omega^2\alpha^2)$$

Note that α is a time constant.

Figure 11A:
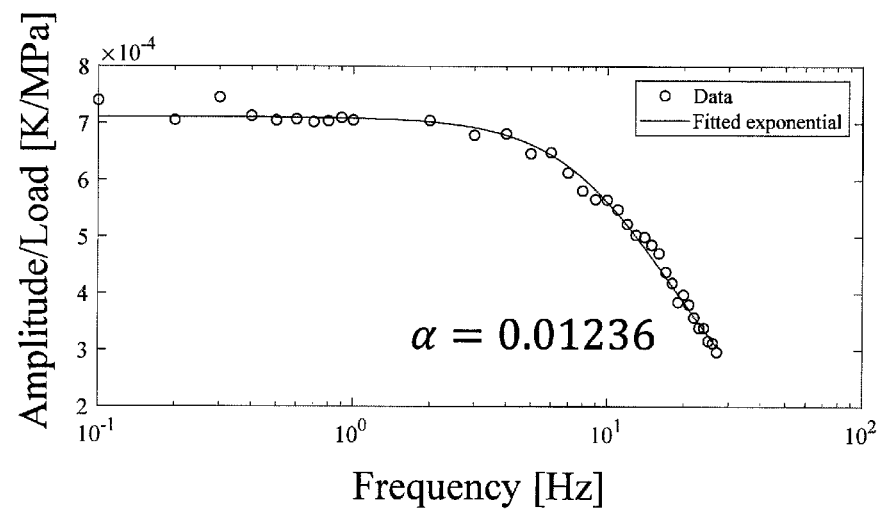
FIG. 11A is a diagram illustrating a time constant in the frequency response function of the first-order lag system for the temperature image of the field of view 1 by a sinusoidal load experiment.
Figure 11B:
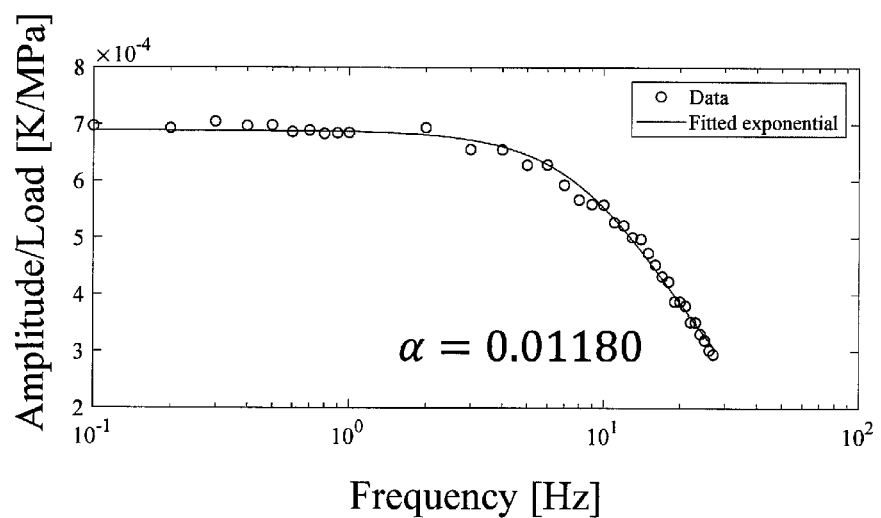
FIG. 11B is a diagram illustrating the time constant in the frequency response function of the first-order lag system for the temperature image of the field of view 2 by the sinusoidal load experiment.
Figure 11C:
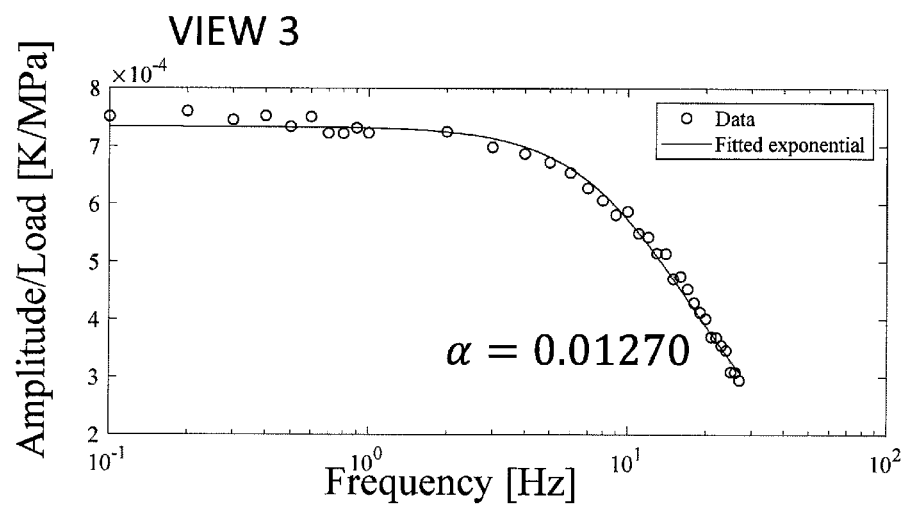
FIG. 11C is a diagram illustrating the time constant in the frequency response function of the first-order lag system for the temperature image of the field of view 3 by the sinusoidal load experiment.
Figure 11D:
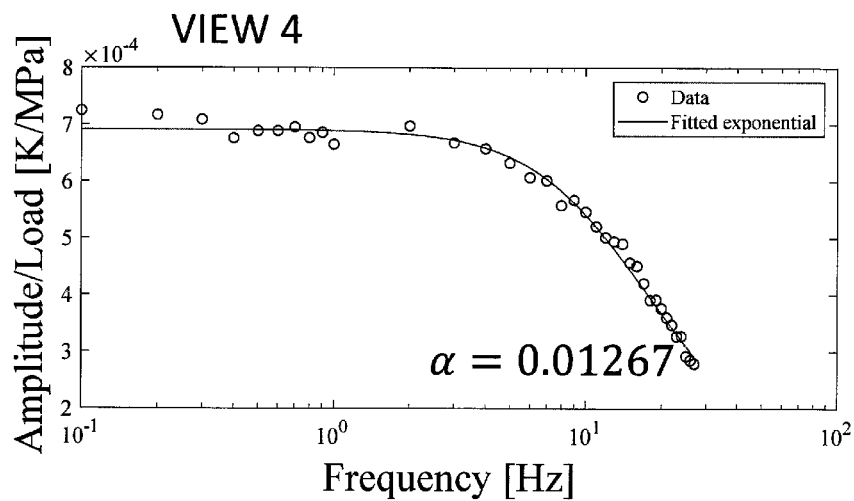
FIG. 11D is a diagram illustrating the time constant in the frequency response function of the first-order lag system for the temperature image of the field of view 4 by the sinusoidal load experiment.

FIG. 11A is a diagram illustrating the time constant in the frequency response function of the first-order lag system for the temperature image of the field of view 1 by a sinusoidal load experiment. FIG. 11B is a diagram illustrating the time constant in the frequency response function of the first-order lag system for the temperature image of the field of view 2 by the sinusoidal load experiment. FIG. 11C is a diagram illustrating the time constant in the frequency response function of the first-order lag system for the temperature image of the field of view 3 by the sinusoidal load experiment. FIG. 11D is a diagram illustrating the time constant in the frequency response function of the first-order lag system for the temperature image of the field of view 4 by the sinusoidal load experiment.

As illustrated in FIGS. 11A to 11D, the temperature change obtained by applying a known sinusoidal load to the object 1 is divided by the stress and fitted by the frequency response function of the first-order lag system, so that a time constant α can be obtained. The frequency response function of the first-order lag system of each field of view is calculated using the obtained time constant α, and for each temperature image, the relationship between the frequency and the amplitude after Fourier transformation can be divided by the calculated frequency response function of the first-order lag system to correct the amplitude.

Note that the upper limit of the frequency range to be corrected is not limited to 10 Hz.

When the frequency characteristic of the imaging element is constant, the amplitude correction is not necessary.

<Starting Point Setter>

The starting point setter 35g aligns the starting points of each temperature image after pixel rearrangement based on the synchronization signal included in each temperature image. By including the synchronization signal in each temperature image, the same time of each temperature image can be identified, and the starting points can be aligned. The synchronization signal is recorded as, for example, the temperature change at the same time in each temperature image by light emission of an LED lamp. By emitting light from the LED lamp, the temperature change at the same time in each temperature image can be used as the synchronization signal.

The synchronization signal is not limited to a record as the temperature change at the same time in each temperature image by the light emission of the LED lamp. For example, opening and closing of a shutter at the time of imaging of each imaging element may be used as the synchronization signal.

Further, a method of aligning the starting points is not limited to a case of using the synchronization signal included in each temperature image described above. For example, a cross-correlation of the temperature images may be calculated to calculate the timing at which the amplitudes of the temperature images best match, and align the starting points.

Figure 12:
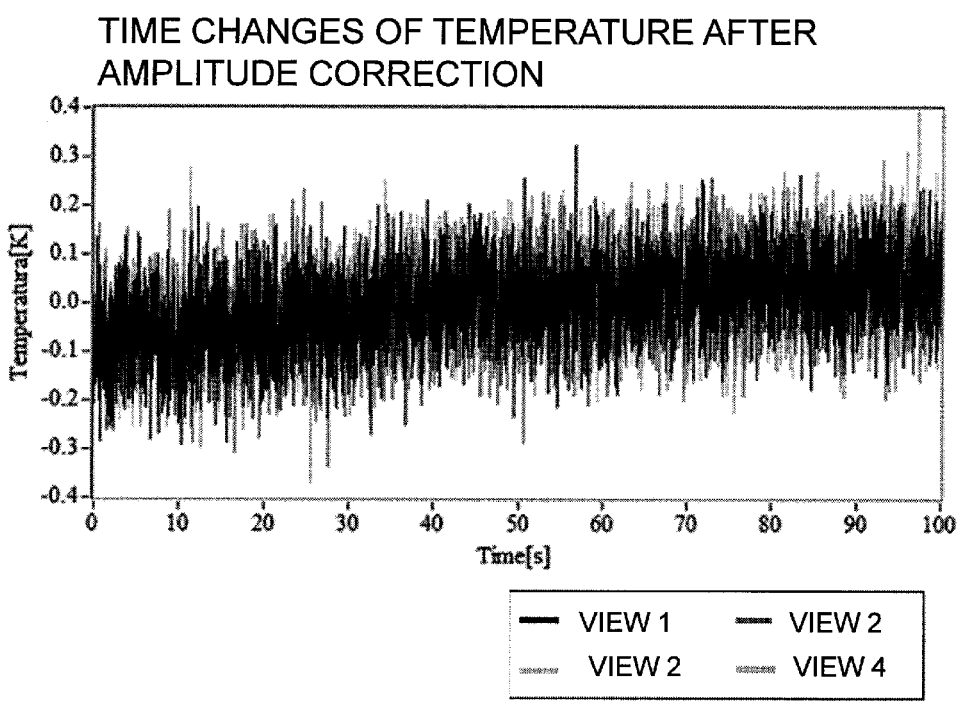
FIG. 12 is a diagram illustrating time changes of temperature of the same corresponding pixels in the fields of view after amplitude correction in a superimposed manner.
Figure 13:
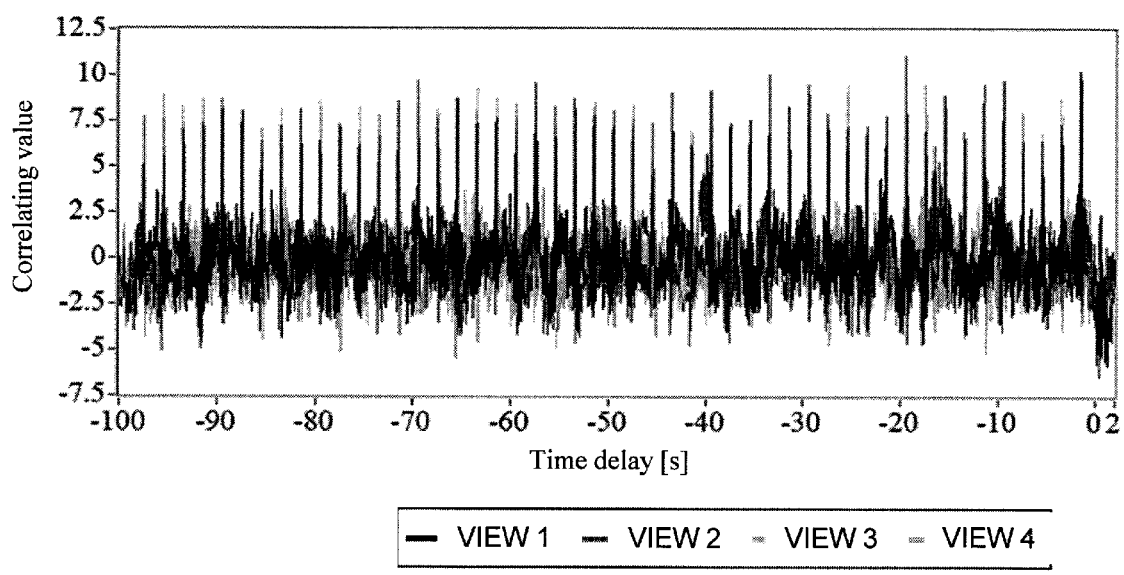
FIG. 13 is a diagram illustrating the time changes of temperature of the same corresponding pixels in the fields of view after amplitude correction of FIG. 12 by aligning starting points and superimposing them.

FIG. 12 is a diagram illustrating time changes of temperature of the same corresponding pixels in the fields of view after amplitude correction in a superimposed manner. FIG. 13 is a diagram illustrating the time changes of temperature of the same corresponding pixels in the fields of view after amplitude correction of FIG. 12 by aligning the starting points and superimposing them.

In FIG. 12, since the starting points of the temperature images of the fields of view vary from each other, the temperature changes of the same period do not overlap for the fields of view. On the other hand, as illustrated in FIG. 13, by aligning the starting points of the temperature images of the fields of view, it can be seen that the temperature changes of the same period overlap with each other for the temperature images of the fields of view.

Note that it is not necessary to set the starting points when the starting points are aligned with each other in hardware, like the compound eye infrared camera.

<Stress Converter>

The stress converter 35h obtains the stress images by multiplying the temperature images after pixel rearrangement by the stress conversion coefficient. The stress converter 35h calculates a stress change amount Δδ from a temperature change amount ΔT by using, for example, the following equation (1) expressing thermoelastic effects.

$$\Delta T = -KT\Delta\delta \quad (1)$$

K is a thermoelastic coefficient, $K=\alpha/(\rho Cp)$, and T is an absolute temperature of the surface of the object. $\alpha$ is a linear expansion coefficient of the surface of the object, $\rho$ is a density of the surface of the object, and Cp is a specific heat of the surface of the object under constant stress.

Then, the stress converter 35h can obtain the stress image based on the stress change amount of all pixels.

Figure 14A:
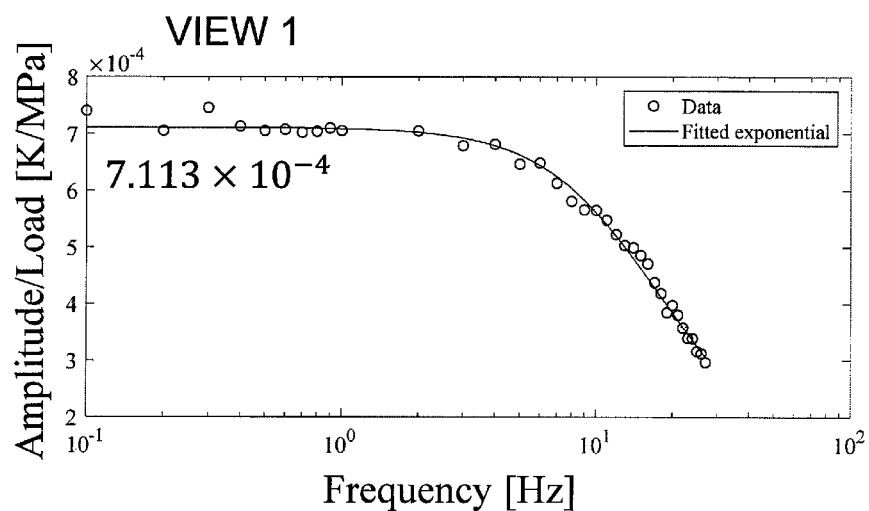
FIG. 14A is a diagram illustrating a stress conversion coefficient calculated as a reciprocal of an intercept for the temperature image of the field of view 1 by the sinusoidal load experiment.
Figure 14B:
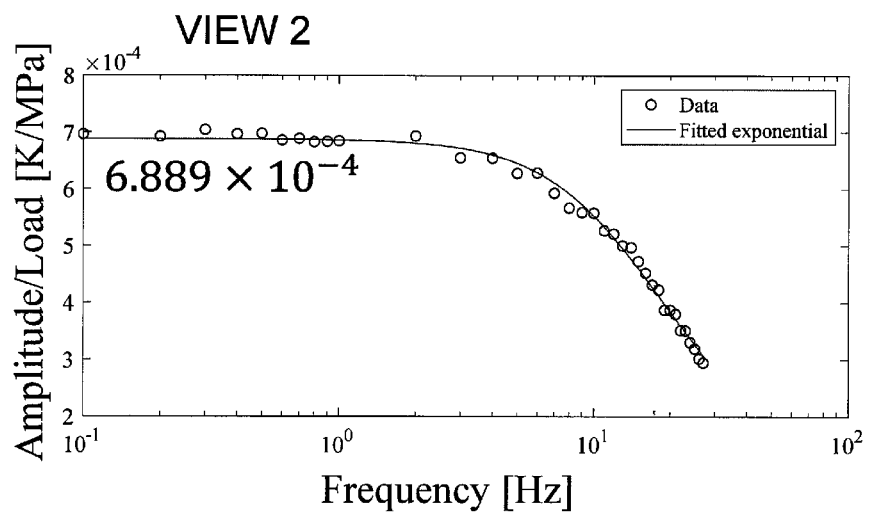
FIG. 14B is a diagram illustrating the stress conversion coefficient calculated as the reciprocal of the intercept for the temperature image of the field of view 2 by the sinusoidal load experiment.
Figure 14C:
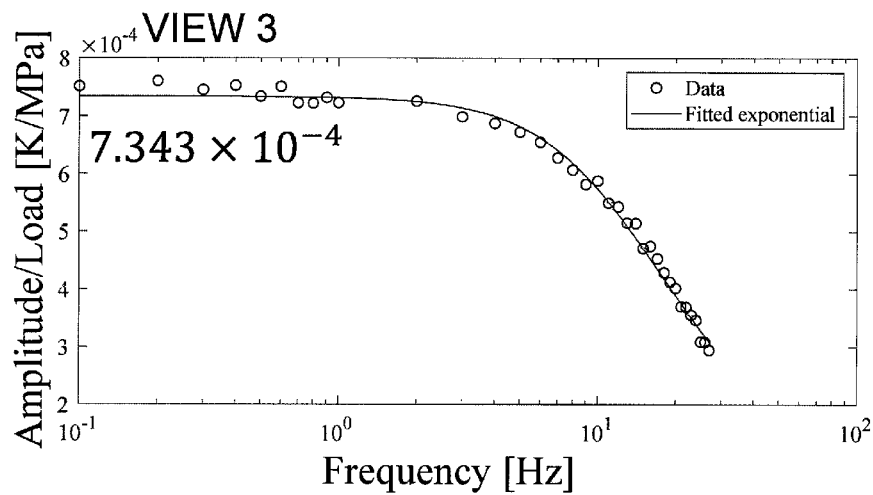
FIG. 14C is a diagram illustrating the stress conversion coefficient calculated as the reciprocal of the intercept for the temperature image of the field of view 3 by the sinusoidal load experiment.
Figure 14D:
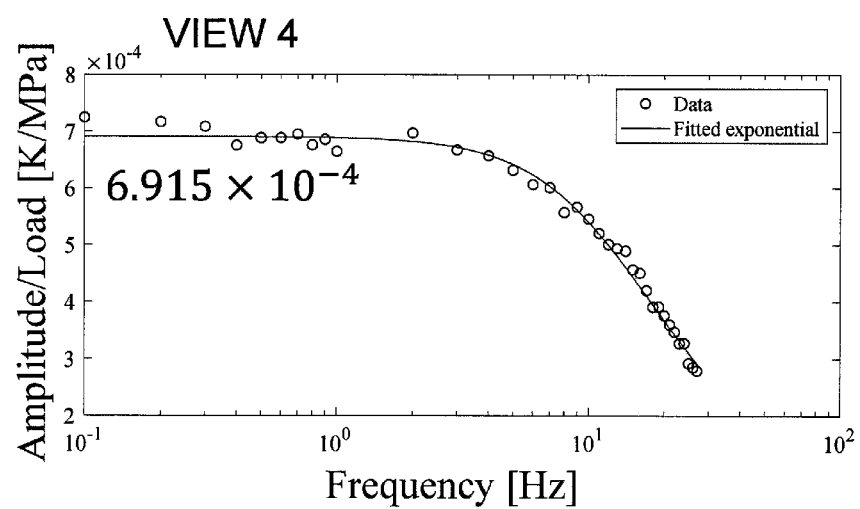
FIG. 14D is a diagram illustrating the stress conversion coefficient calculated as the reciprocal of the intercept for the temperature image of the field of view 4 by the sinusoidal load experiment.

FIG. 14A is a diagram illustrating the stress conversion coefficient calculated as a reciprocal of an intercept for the temperature image of the field of view 1 by the sinusoidal load experiment. FIG. 14B is a diagram illustrating the stress conversion coefficient calculated as the reciprocal of the intercept for the temperature image of the field of view 2 by the sinusoidal load experiment. FIG. 14C is a diagram illustrating the stress conversion coefficient calculated as the reciprocal of the intercept for the temperature image of the field of view 3 by the sinusoidal load experiment. FIG. 14D is a diagram illustrating the stress conversion coefficient calculated as the reciprocal of the intercept for the temperature image of the field of view 4 by the sinusoidal load experiment.

Using the stress conversion coefficients illustrated in FIGS. 14A to 14D, the stress images can be obtained for the time changes of the temperature images of the fields of view.

Note that this stress conversion is not limited to a case where it is performed at a timing after the starting point is set. For example, it may be performed after reading the temperature image. Further, it may be performed at any timing after background temperature subtraction, the spline interpolation, the amplitude correction, or additional averaging.

<Additional Averaging Part>

The additional averaging part 35i obtains the additional averaging stress image by adding and averaging the stress images. The number of stress images to be added and averaged is two or more. Increasing the number of stress images will increase the accuracy, but if it is too many, it will take time for processing. Further, as the number of imaging elements increases, it is difficult to arrange them. Therefore, usually, for example, four stress images are added and averaged. At most 8 to 10 stress images are added and averaged.

Figure 15A:
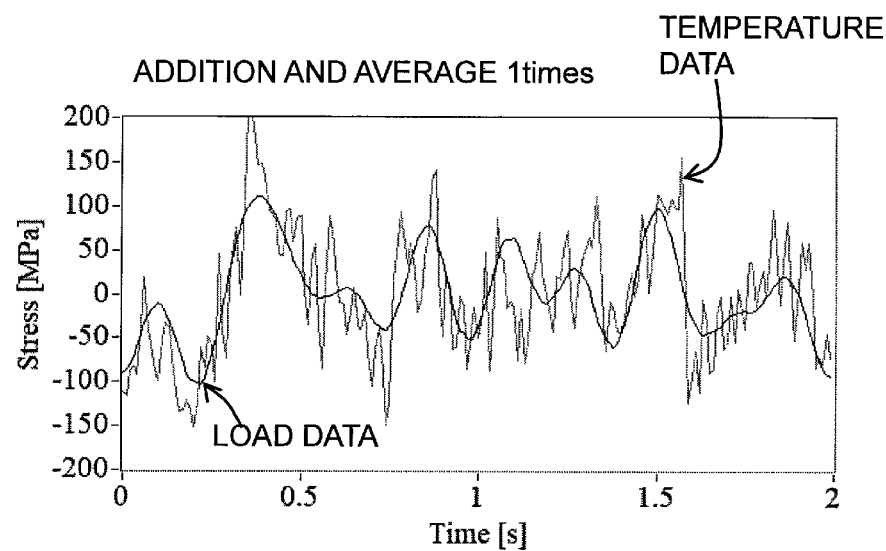
FIG. 15A is a diagram illustrating temperature data, which is the time change of the temperature of one pixel in the temperature image of one field of view, and load data, in a superimposed manner.
Figure 15B:
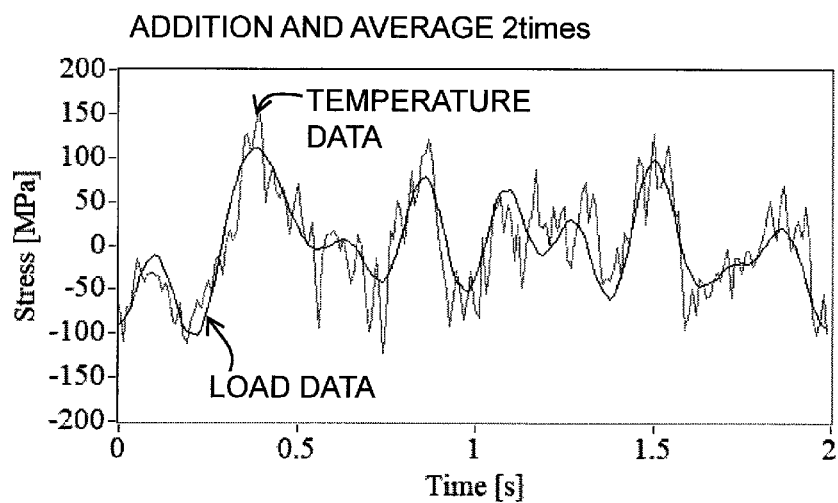
FIG. 15B is a diagram illustrating temperature data, which is a temperature change of additional averaging of temperatures of the same corresponding pixels in temperature images of two fields of view, and the load data, in a superimposed manner.
Figure 15C:
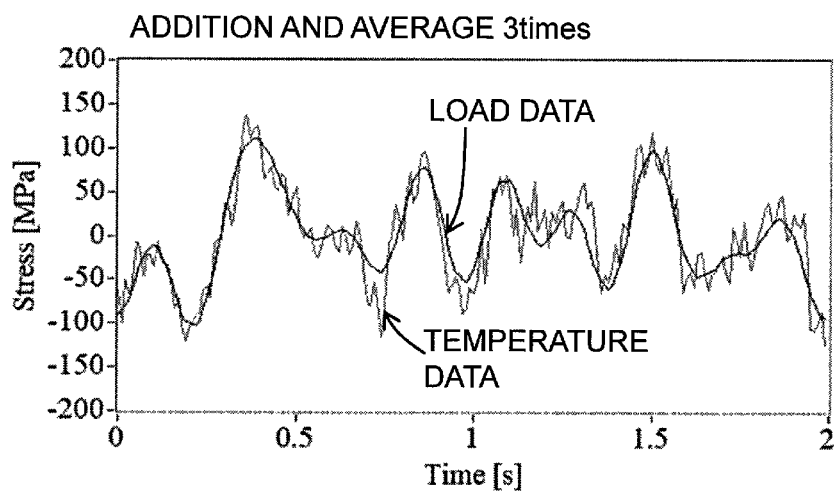
FIG. 15C is a diagram illustrating temperature data, which is a temperature change of additional averaging of temperatures of the same corresponding pixels in temperature images of three fields of view, and the load data, in a superimposed manner.
Figure 15D:
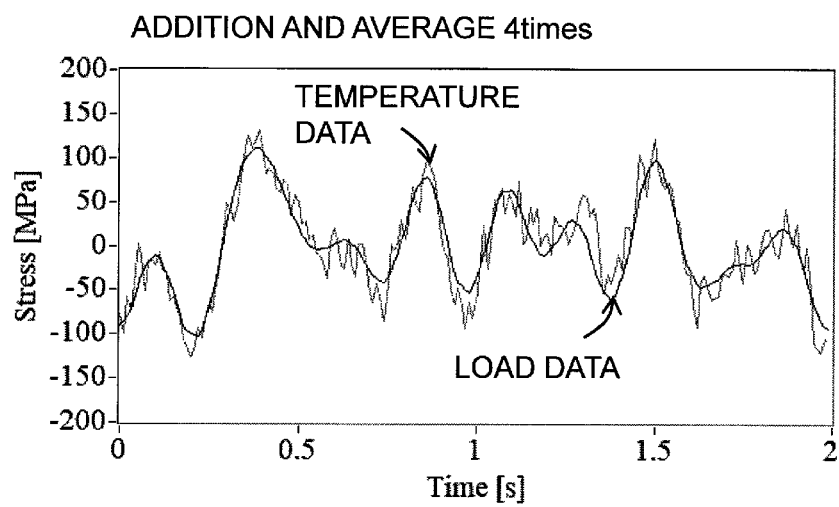
FIG. 15D is a diagram illustrating temperature data, which is a temperature change of additional averaging of temperatures of the same corresponding pixels in temperature images of four fields of view, and the load data, in a superimposed manner.

FIG. 15A is a diagram illustrating the temperature data, which is the time change of the temperature of one pixel in the temperature image of one field of view, and the load data, in a superimposed manner. FIG. 15B is a diagram illustrating the temperature data, which is a temperature change of additional averaging of temperatures of the same corresponding pixels in the temperature images of two fields of view, and the load data, in a superimposed manner. FIG. 15C is a diagram illustrating the temperature data, which is a temperature change of additional averaging of temperatures of the same corresponding pixels in the temperature images of three fields of view, and the load data, in a superimposed manner. FIG. 15D is a diagram illustrating the temperature data, which is a temperature change of additional averaging of temperatures of the same corresponding pixels in the temperature images of four fields of view, and the load data, in a superimposed manner. In FIGS. 15A to 15D, the load data applied to the object is known. Therefore, the accuracy of stress conversion from the temperature image to the stress image can be known by superimposing the temperature data obtained from the time change of the temperature image and the load data. That is, the more the temperature data is in line with the load data, the higher the accuracy of stress conversion.

Since the stress conversion from the "temperature data" to "stress data" is a linear conversion, a unit of "temperature data" is represented by "MPa" after the stress conversion in the figures.

As illustrated in FIG. 15A, the temperature data obtained from one temperature image has a large noise with respect to the load data, and the accuracy of the stress image is not sufficient. On the other hand, when comparing FIG. 15B, which is additional averaging of the temperature data obtained from two temperature images, FIG. 15C, which is additional averaging of the temperature data obtained from three temperature images, and FIG. 15D, which is additional averaging of the temperature data obtained from four temperature images, it can be seen that the temperature data approaches the load data as the number of times of additional averaging increases. By adding and averaging the plurality of temperature images, that is, a plurality of stress images to calculate the additional averaging stress image, the stress image with improved accuracy can be obtained.

Figure 16:
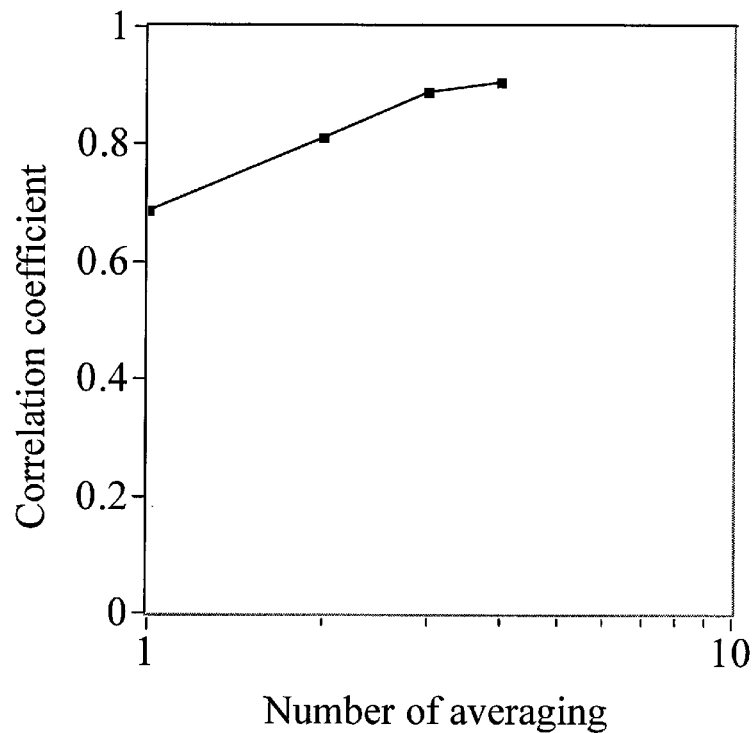
FIG. 16 is a diagram illustrating a relationship between the number of times of additional averaging for one pixel and a correlation coefficient between the temperature data and the load data.
Figure 17:
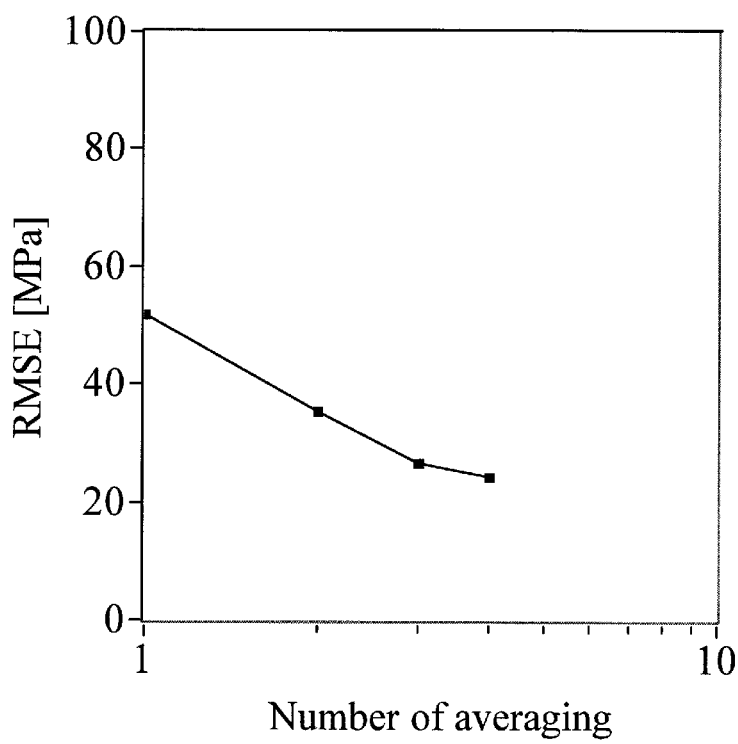
FIG. 17 is a diagram illustrating a relationship between the number of times of additional averaging for the one pixel and a root mean square error (RISE) between the temperature data and the load data.
Figure 18A:
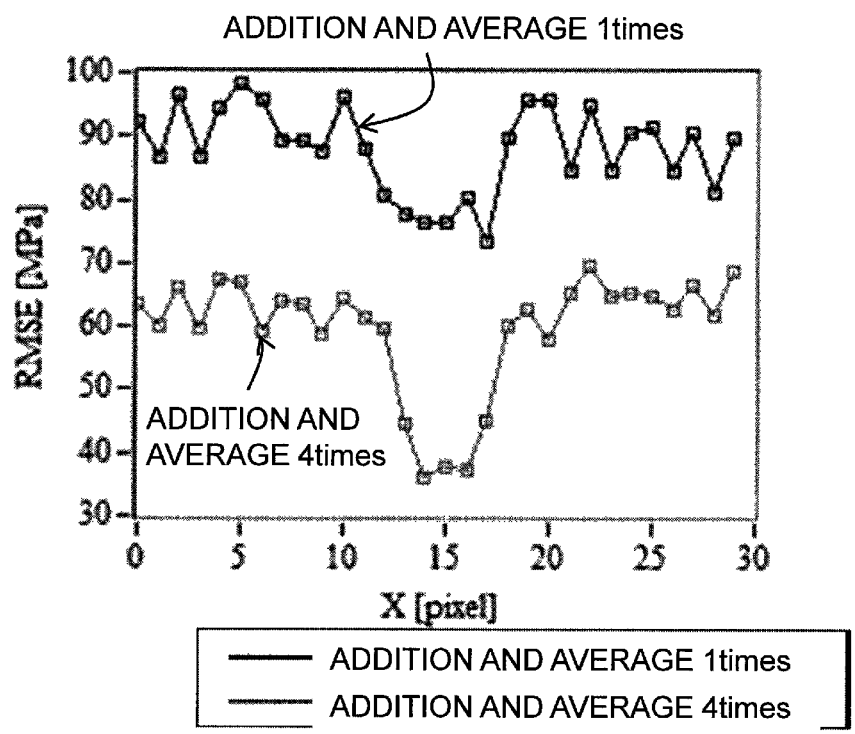
FIG. 18A is a diagram illustrating the root mean square error (RMSE) between the temperature data and the load data when the additional averaging is once and four times in an X direction of the temperature image.
Figure 18B:
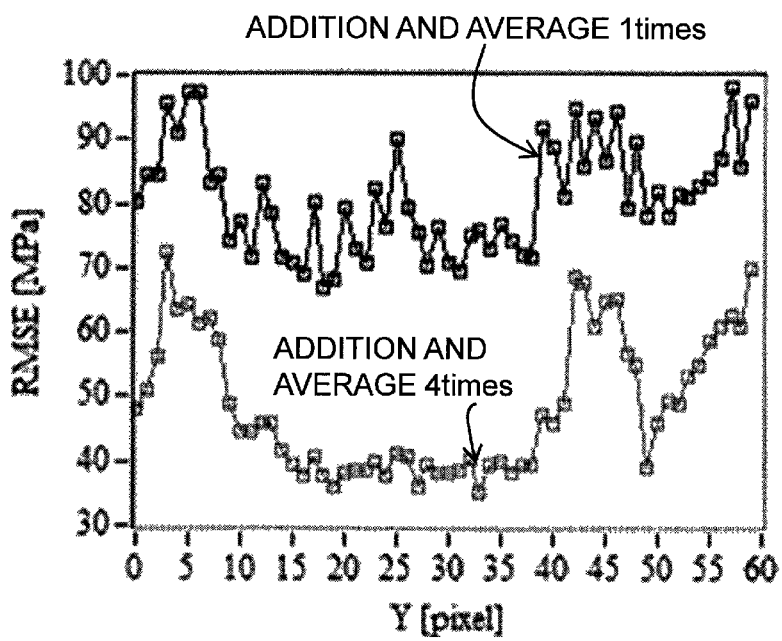
FIG. 18B is a diagram illustrating the root mean square error (RMSE) between the temperature data and the load data when the additional averaging is once and four times in a Y direction of the temperature image.

FIG. 16 is a diagram illustrating a relationship between the number of times of additional averaging for one pixel and a correlation coefficient between the temperature data and the load data. FIG. 17 is a diagram illustrating a relationship between the number of times of additional averaging for the one pixel and a root mean square error (RMSE) between the temperature data and the load data. FIG. 18A is a diagram illustrating the root mean square error (RMSE) between the temperature data and the load data when the additional averaging is once and four times in an X direction of the temperature image. FIG. 18B is a diagram illustrating the root mean square error (RMSE) between the temperature data and the load data when the additional averaging is once and four times in a Y direction of the temperature image.

As illustrated in FIG. 16, the correlation coefficient between the temperature data and the load data increases as the number of times of additional averaging increases. Further, as illustrated in FIG. 17, the root mean square error (RMSE) between the temperature data and the load data decreases as the number of times of additional averaging increases. Furthermore, as illustrated in FIG. 18A, the root mean square error (RMSE) between the temperature data and the load data is smaller when the additional averaging is four times than when the additional averaging is once in the X direction of the temperature image. Similarly, as illustrated in FIG. 18B, the root mean square error (RMSE) between the temperature data and the load data is smaller when the additional averaging is four times than when the additional averaging is once in the Y direction of the temperature image.

As described above, it can be seen that the stress image with improved accuracy can be obtained by calculating the additional averaging stress image by adding and averaging the plurality of temperature images, that is, the plurality of stress images.

Display

The display 33 may display a captured temperature image, a graph of temperature change, an obtained stress image, the additional averaging stress image, and the like.

Modification

Figure 3:
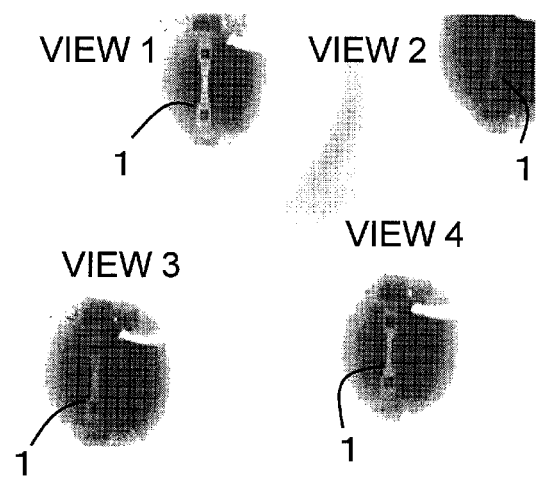
FIG. 3 is a schematic view illustrating four temperature images of a field of view 1 to a field of view 4 by a compound eye camera used in a stress analysis device according to a modification.

FIG. 3 is a schematic view illustrating four temperature images of the field of view 1 to the field of view 4 by the compound eye infrared camera of the imaging element used in the stress analysis device 40 according to the modification. The modification differs in that the plurality of imaging elements are not used as illustrated in FIG. 1. That is, it is characterized in that the plurality of temperature images of the fields of view 1 to 4 are captured in one imaging element. In the modification, the compound eye infrared camera having a plurality of lenses for one imaging element is used. As illustrated in FIG. 3, the compound eye infrared camera has the plurality of lenses for one imaging element, and can capture four temperature images of the fields of view 1 to 4 by the lenses by the one imaging element. The number of fields of view is an example and is not limited to this.

Further, in FIG. 1, optical paths leading to the imaging elements are different optical paths from different viewpoints, but the optical paths are not limited to this. As another modification, for example, an optical path may be divided from the same optical axis using a prism and guided to the plurality of imaging elements to obtain the plurality of temperature images having the same optical axis. Thus, since the temperature images have the same optical axis and substantially the same pixel array, it is possible to reduce loads of feature point extraction, the projective transformation, and the pixel rearrangement, which will be described below.

<Stress Analysis Method>

Figure 2:
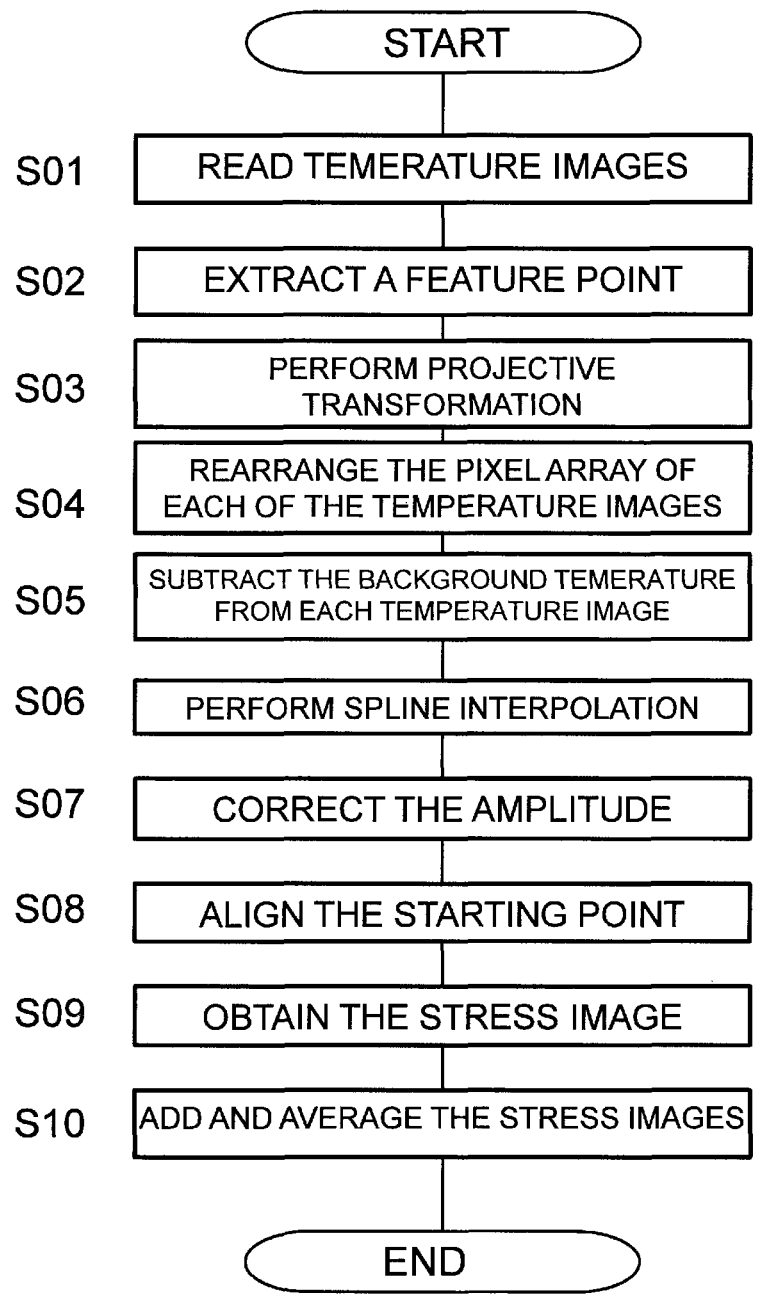
FIG. 2 is a flowchart of a stress analysis method according to the first embodiment.

FIG. 2 is a flowchart of the stress analysis method according to the first embodiment. The stress analysis method will be described below. Since details of the steps are substantially the same as those described for "imaging element", "feature point extractor", "projection transformer", "pixel rearranger", "background temperature subtractor", "spline interpolator", "amplitude corrector", "starting point setter", "stress converter", and "additional averaging part", duplicate description will be omitted here.

(1) Read two or more temperature images over the same time range for the same region of the object 1 (S01). Specifically, read the two or more temperature images captured by the imaging elements 20a to 20d into the image processor 30.

(2) Extract a feature point for each of the temperature images (S02). For example, an aluminum thin film having a low emissivity may be attached to a part of the object 1 to form the pattern of the feature points.

(3) Perform projective transformation on each of the temperature images so as to align the feature point, and perform alignment with respect to the temperature image that is the reference (S03).

(4) Rearrange the pixel array of each of the temperature images subjected to the projective transformation with respect to the pixel array of the temperature image that is the reference (S04). By rearranging the pixels of the pixel array of the field of view 2 to the pixel array similar to the pixel array of the nearest field of view 1, the pixel array of the field of view 2 has the same configuration as the pixel array of the field of view 1.

(5) Subtract the background temperature from each temperature image (S05). This makes it possible to reduce the back noise generated by the temperature change of the environment. Specifically, the background temperature is detected from the background object, and the background temperature is subtracted from the temperature image.

(6) Perform spline interpolation over the same time range of the temperature images (S06). Thus, even when the frame rate is different for each imaging element, the sampling is performed at different timings, and the data point is different in each temperature image, the data points at the same timing can be calculated by interpolation.

(7) For each temperature image, the relationship between the frequency and the amplitude after Fourier transformation is divided by the frequency response function of the first-order lag system to correct the amplitude (S07). For example, the amplitude is corrected by dividing by the frequency response function illustrated in FIG. 10.

(8) For the temperature images, align the starting point based on the synchronization signal included in advance (S08). The synchronization signal may be recorded as, for example, the temperature change at the same time in each temperature image by light emission of an LED lamp. Alternatively, the opening and closing of the shutter at the time of imaging of each imaging element may be used as the synchronization signal. Further, a method of aligning the starting points is not limited to a case of using the synchronization signal included in each temperature image described above. For example, the cross-correlation of the temperature images may be calculated to align the starting points.

(9) The temperature images are multiplied by the stress conversion coefficient to obtain the stress image (S09). For example, the stress change amount $\Delta\delta$ is calculated from the temperature change amount $\Delta T$ using the equation $\Delta T = -KT\Delta\delta$ expressing the thermoelastic effect. As described above, the stress conversion coefficient of each imaging element can be calculated based on the temperature image obtained by applying a known load.

(10) Add and average the stress images to obtain the additional averaging stress image (S10). The number of stress images to be added and averaged is two or more. By adding and averaging the plurality of temperature images, that is, a plurality of stress images to calculate the additional averaging stress image, the stress image with improved accuracy can be obtained.

From the above, the stress image with improved accuracy can be obtained.

Second Embodiment

<Temperature Measuring Device>

Figure 19:
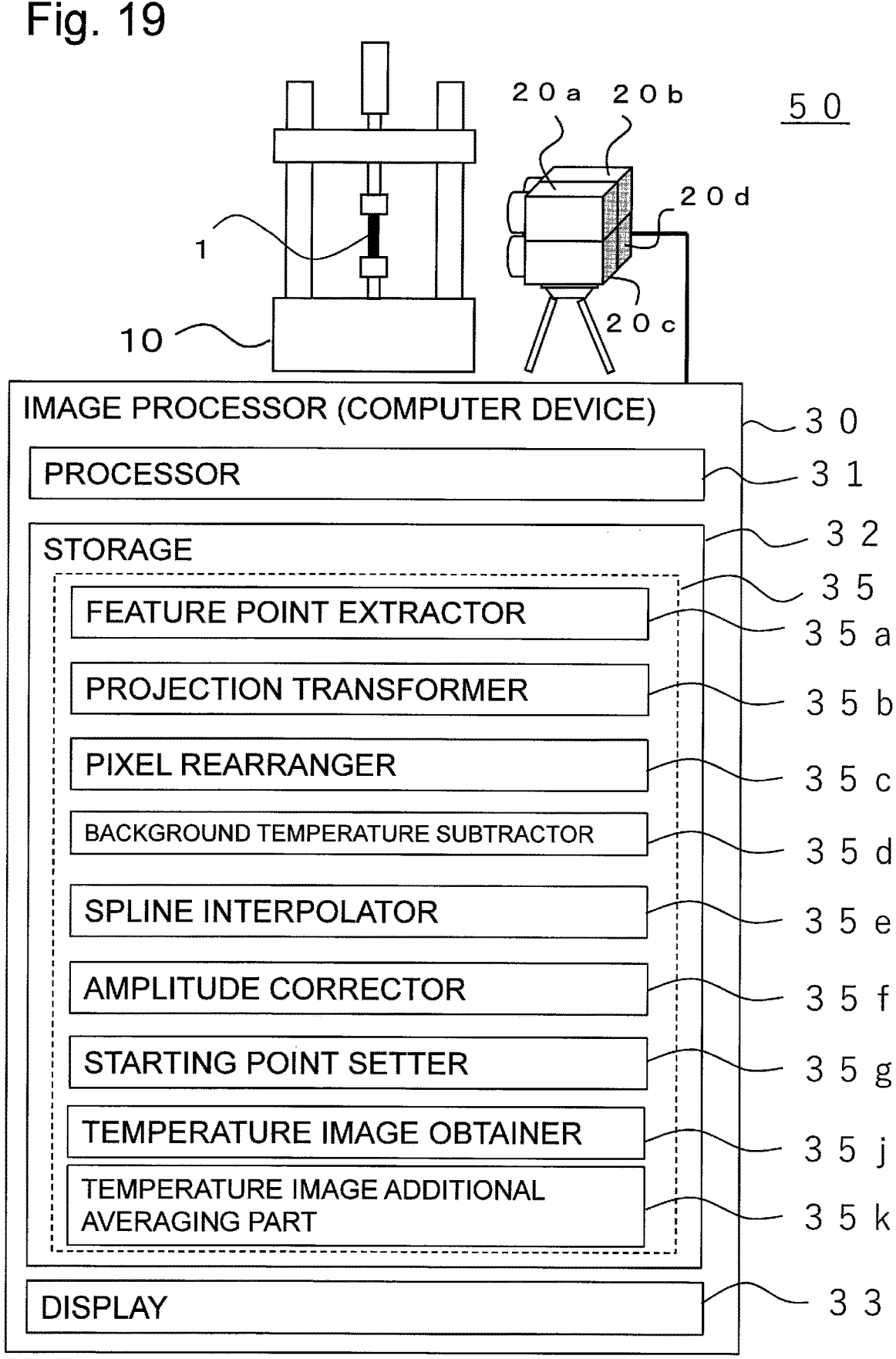
FIG. 19 is a block diagram illustrating a configuration of a temperature measuring device 50 according to a second embodiment.

FIG. 19 is a block diagram illustrating a configuration of a temperature measuring device 50 according to a second embodiment.

The temperature measuring device 50 includes the imaging elements 20a to 20d that obtain two or more temperature images, the feature point extractor 35a that extracts the feature point in each of the temperature images, the projection transformer 35b that aligns the temperature images, the pixel rearranger 35c that rearranges the pixel array of the temperature images, a temperature image obtainer 35j that obtains the temperature images, and a temperature image additional averaging part 35k that obtains the additional averaging temperature image by adding and averaging the temperature images. The imaging elements 20a to 20d obtain two or more temperature images over the same time range for the same region of an object 1. The projection transformer 35b performs projective transformation on the temperature images so as to align the feature point in the temperature images, and aligns the temperature images with respect to the temperature image that is the reference. The pixel rearranger 35c rearranges the pixel array of the temperature images subjected to the projective transformation with respect to the pixel array of the temperature image that is the reference.

According to the temperature measuring device 50, comparing with the stress analysis device according to the first embodiment, the temperature image is obtained as it is without multiplying the temperature image by the stress conversion coefficient, and two or more temperature images are added and averaged to obtain the additional averaging temperature image. Thus, the noise generated from the imaging element is canceled by adding and averaging the temperature images, so that the temperature image with improved accuracy can be obtained.

Members constituting the temperature measuring device 50 will be described below.

Since the imaging elements 20a to 20d, the feature point extractor 35a, the projection transformer 35b, the pixel rearranger 35c, the background temperature subtractor 35d, the spline interpolator 35e, the amplitude corrector 35f, and the starting point setter 35g are substantially the same as those in the first embodiment, description thereof will be omitted.

<Temperature Image Obtainer>

The temperature image obtainer 35j obtains the temperature image as it is without multiplying the temperature image by the stress conversion coefficient.

<Temperature Image Additional Averaging Part>

The temperature image additional averaging part 35k obtains the additional averaging temperature image by adding and averaging two or more temperature images.

<Temperature Measuring Method>

Figure 20:
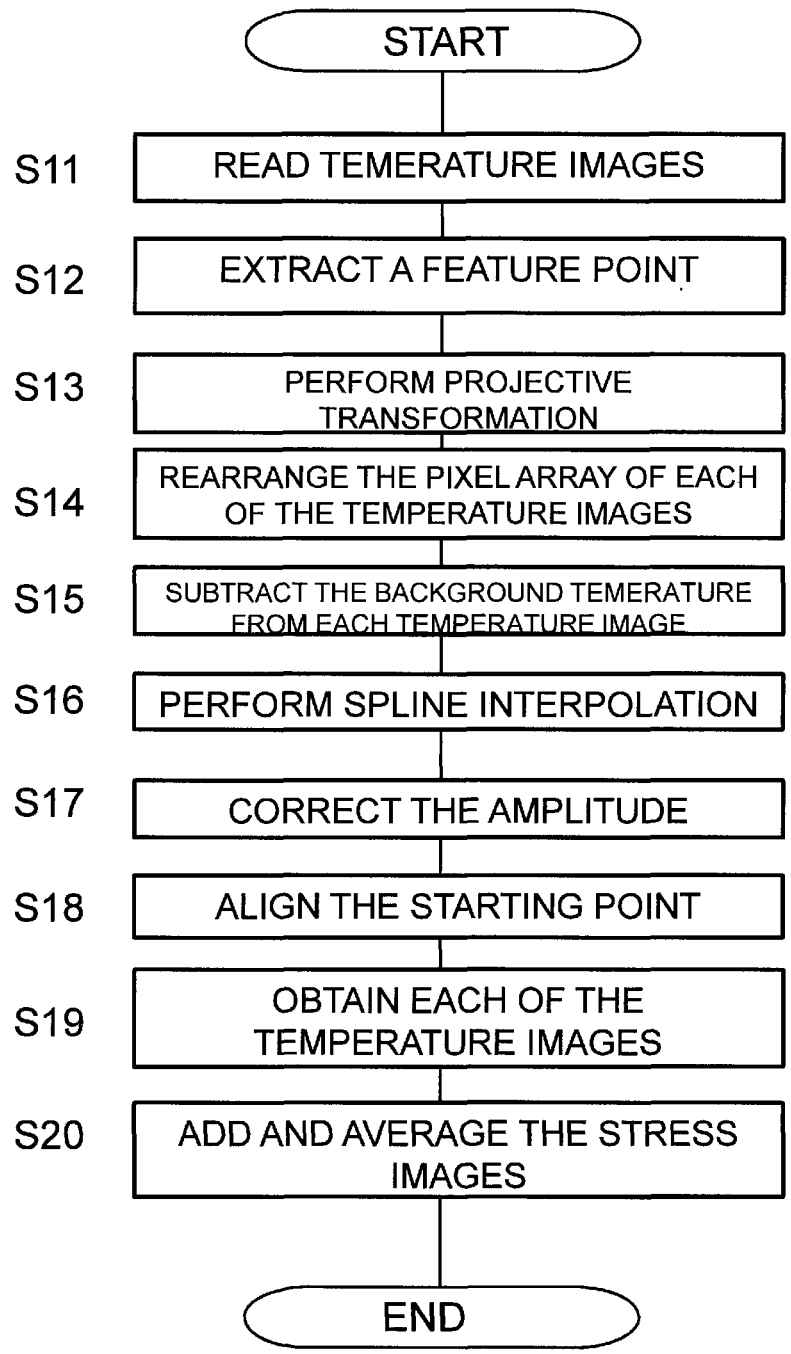
FIG. 20 is a flowchart of a temperature measuring method according to the second embodiment.

FIG. 20 is a flowchart of the temperature measuring method according to the second embodiment. The temperature measuring method will be described below. Since details of the steps are substantially the same as those described for "imaging element", "feature point extractor", "projection transformer", "pixel rearranger", "background temperature subtractor", "spline interpolator", "amplitude corrector", "starting point setter", "temperature image obtainer", and "temperature image additional averaging part", the duplicate description will be omitted here. Further, since the following steps S11 to S18 are substantially the same as the steps S01 to S08 of the stress analysis method according to the first embodiment, a part of the description will be omitted.

(1) Read two or more temperature images over the same time range for the same region of the object 1 (S11).

(2) Extract feature points for the temperature images (S12).

(3) Perform projective transformation on each of the temperature images so as to align the feature point, and perform alignment with respect to the temperature image that is the reference (S13).

(4) Rearrange the pixel array of each of the temperature images subjected to the projective transformation with respect to the pixel array of the temperature image that is the reference (S14).

(5) Subtract the background temperature from each temperature image (S15). This makes it possible to reduce the back noise generated by the temperature change of the environment.

(6) Perform spline interpolation over the same time range of the temperature images (S16). Thus, even when the frame rate is different for each imaging element, the sampling is performed at different timings, and the data point is different in each temperature image, the data points at the same timing can be calculated by interpolation.

(7) For each temperature image, the relationship between the frequency and the amplitude after Fourier transformation is divided by the frequency response function of the first-order lag system to correct the amplitude (S17).

(8) For the temperature images, align the starting point based on the synchronization signal included in advance (S18).

(9) Obtain each of the temperature images (S19).

(10) Add and average the temperature images to obtain the additional averaging temperature image (S20). The number of temperature images to be added and averaged is two or more.

From the above, by adding and averaging the plurality of temperature images to calculate the additional averaging temperature image, the temperature image with improved accuracy can be obtained.

It is to be noted that the present disclosure includes appropriately combining any of the embodiments and/or examples among the various embodiments and/or examples described above, and can obtain the effects of the embodiments and/or examples.

According to the stress analysis device according to the present disclosure, the stress image with improved accuracy can be obtained by adding and averaging the plurality of temperature images, that is, the plurality of stress images to calculate the additional averaging stress image.

EXPLANATIONS OF LETTERS OR NUMERALS

1 OBJECT
10 LOAD APPLYING PORTION
20a, 20b, 20c, 20d IMAGING ELEMENT
30 IMAGE PROCESSOR (COMPUTER DEVICE)
31 PROCESSOR
32 STORAGE
33 DISPLAY
35 PROGRAM

35a FEATURE POINT EXTRACTOR
35b PROJECTION TRANSFORMER
35c PIXEL REARRANGER
35d BACKGROUND TEMPERATURE SUBTRACTOR
35e SPLINE INTERPOLATOR
35f AMPLITUDE CORRECTOR
35g STARTING POINT SETTER
35h STRESS CONVERTER
35i ADDITIONAL AVERAGING PART
35j TEMPERATURE IMAGE OBTAINER
35k TEMPERATURE IMAGE ADDITIONAL AVERAGING PART
40 STRESS ANALYSIS DEVICE
50 TEMPERATURE MEASURING DEVICE

What is claimed is:

1. A stress analysis device comprising:
an imaging element that obtains two or more temperature images over a same time range for a same region of an object;
a feature point extractor that extracts a feature point in each of the temperature images;
a projection transformer that performs projective transformation on each of the temperature images so as to align the feature point in the temperature images, and aligns the temperature images with respect to a temperature image that is a reference;
a pixel rearranger that rearranges a pixel array of each of the temperature images subjected to the projective transformation with respect to a pixel array of the temperature image that is the reference;
a stress converter that obtains a stress image by multiplying each of the temperature images after pixel rearrangement by a stress conversion coefficient; and
an additional averaging part that obtains an additional averaging stress image by adding and averaging the stress images.

2. The stress analysis device according to claim 1, further comprising a background temperature subtractor that subtracts a background temperature from each of the temperature images after pixel rearrangement.

3. The stress analysis device according to claim 1, further comprising an amplitude corrector that corrects amplitude of each of the temperature images after pixel rearrangement by dividing a relationship between a frequency and an amplitude after Fourier transformation by a frequency response function of a first-order lag system.

4. The stress analysis device according to claim 1, further comprising a spline interpolator that performs spline interpolation over the same time range of each of the temperature images after pixel rearrangement.

5. The stress analysis device according to claim 1, wherein
when obtaining the two or more temperature images, the imaging element causes a synchronization signal to be included in the two or more temperature images, and
the stress analysis device further comprises a starting point setter that aligns starting point for the temperature images after pixel rearrangement based on the synchronization signal.

6. A stress analysis method comprising:
obtaining two or more temperature images over a same time range for a same region of an object;
extracting a feature point in each of the temperature images;
performing projective transformation on each of the temperature images so as to align the feature point in the temperature images, and aligning the temperature images with respect to a temperature image that is a reference;
rearranging a pixel array of each of the temperature images subjected to the projective transformation with respect to a pixel array of the temperature image that is the reference;
obtaining a stress image by multiplying each of the temperature images after pixel rearrangement by a stress conversion coefficient; and
obtaining an additional averaging stress image by adding and averaging the stress images.

7. A temperature measuring device comprising:
an imaging element that obtains two or more temperature images over a same time range for a same region of an object;
a feature point extractor that extracts a feature point in each of the temperature images;
a projection transformer that performs projective transformation on each of the temperature images so as to align the feature point in the temperature images, and aligns the temperature images with respect to a temperature image that is a reference;
a pixel rearranger that rearranges a pixel array of each of the temperature images subjected to the projective transformation with respect to a pixel array of the temperature image that is the reference;
a temperature image obtainer that obtains each of the temperature images after pixel rearrangement; and
a temperature image additional averaging part that obtains an additional averaging temperature image by adding and averaging the temperature images.

8. A temperature measuring method comprising:
obtaining two or more temperature images over a same time range for a same region of an object;
extracting a feature point in each of the temperature images;
performing projective transformation on each of the temperature images so as to align the feature point in the temperature images, and aligning the temperature images with respect to a temperature image that is a reference;
rearranging a pixel array of each of the temperature images subjected to the projective transformation with respect to a pixel array of the temperature image that is the reference;
obtaining each of the temperature images after pixel rearrangement; and
obtaining an additional averaging temperature image by adding and averaging the temperature images.

* * * * *